US008690499B2

(12) United States Patent
Makiyama et al.

(10) Patent No.: US 8,690,499 B2
(45) Date of Patent: Apr. 8, 2014

(54) MACHINE TOOL

(75) Inventors: Tadashi Makiyama, Fukuyama (JP); Hiroaki Kiso, Fukuyama (JP)

(73) Assignee: Horkos Corporation (JP)

( * ) Notice: Subject to any disclaimer, the term of this patent is extended or adjusted under 35 U.S.C. 154(b) by 1181 days.

(21) Appl. No.: 12/450,111

(22) PCT Filed: Mar. 11, 2008

(86) PCT No.: PCT/JP2008/054332
§ 371 (c)(1),
(2), (4) Date: Sep. 11, 2009

(87) PCT Pub. No.: WO2008/111571
PCT Pub. Date: Sep. 18, 2008

(65) Prior Publication Data
US 2010/0074703 A1 Mar. 25, 2010

(30) Foreign Application Priority Data

Mar. 13, 2007 (JP) .................................. 2007-063891

(51) Int. Cl.
*B23C 1/12* (2006.01)
(52) U.S. Cl.
USPC ........... 409/137; 409/164; 409/198; 409/201; 409/211; 409/224; 408/89; 269/60
(58) Field of Classification Search
USPC ........... 408/69, 87, 89, 90, 91; 409/134, 137, 409/164, 198, 201, 211, 219, 221, 224; 269/55, 58, 59, 71, 60, 289 R
IPC ......................................................... B23C 1/12
See application file for complete search history.

(56) References Cited

U.S. PATENT DOCUMENTS

| 6,099,217 | A  | * | 8/2000 | Wiegand et al. | ............... 409/201 |
| 7,331,099 | B2 | * | 2/2008 | Horn et al. | ....................... 29/563 |
| 2001/0008862 | A1 | * | 7/2001 | Gorrochategui | .................. 483/1 |
| 2006/0051171 | A1 | * | 3/2006 | Sugata et al. | ................... 408/71 |
| 2010/0003098 | A1 | * | 1/2010 | Faigle et al. | .................. 409/132 |

FOREIGN PATENT DOCUMENTS

| JP | 9-300149 | 11/1997 |
| JP | 2001-9651 | 1/2001 |

(Continued)

*Primary Examiner* — Daniel Howell
*Assistant Examiner* — Michael Vitale
(74) *Attorney, Agent, or Firm* — Merek, Blackmon & Vorhees, LLC

(57) ABSTRACT

High precision machining is enabled by eliminating the need for a conventional swiveling table, and by enhancing rigidity for supporting a work by relatively reducing the distance from the top surface of a stationary body section (1) to the position for machining a work by means of a tool on a rotary spindle (17). A pair of guide tracks (28a, 28b) respectively passing two positions separated in the X axis direction of the stationary body section (1) and in the Z axis direction intersecting the X axis direction perpendicularly are allowed to guide feed tables (30a, 30b) to be movable independently. A support/feed/turn output member (25) is latched to bridge the feed tables (30a, 30b) on the guide tracks (28a, 28b), one feed table (30a) and the support/feed/turn output member (25) are coupled to rotate relatively about a line in the Y axis direction which intersects perpendicularly both the X axis direction and the Z axis direction, the other feed table (30b) and the support/feed/turn output member (25) are coupled to rotate relatively about a line in the Y axis direction and to displace relatively in a specific direction related to the positions of the both feed tables (30a, 30b), and a means (35) for regulating relative displacement in the specific direction is provided additionally.

8 Claims, 18 Drawing Sheets

(56) References Cited

FOREIGN PATENT DOCUMENTS

| | | |
|---|---|---|
| JP | 2003-136352 A | 5/2003 |
| JP | 2003-316440 A | 11/2003 |
| JP | 2004-195586 | 7/2004 |
| JP | 2005028467 A * | 2/2005 ............... B23Q 1/25 |
| JP | 2006-123011 | 5/2006 |
| WO | WO 2007009481 A1 * | 1/2007 ............... B23C 3/06 |

* cited by examiner

FLOW CHART ABOUT AXIS DISPLACEMENT IN Z1 AXIS AND Z AXIS

There is a B axis pivot.

There is no B axis pivot.

Section A - A

Section B - B

MACHINE TOOL

CROSS-REFERENCE TO RELATED APPLICATION

The present application claims the priority under 35 U.S.C. 119 of Japanese Application No. 2007-063891, filed Mar. 13, 2007, which is hereby incorporated herein by reference in its entirety.

TECHNICAL FIELD

The present invention relates to a machine tool for machining an oblique hole through a shaft-like work such as a crankshaft.

DESCRIPTION OF THE PRIOR ART

There exists a machine tool wherein a longitudinal rotary spindle is provided on a horizontal top surface of a bed to be movable in triaxial directions (longitudinal direction, lateral direction, vertical direction) intersecting one another perpendicularly, a swiveling table turning around a vertical axis is provided on the top surface facing the spindle in the longitudinal direction to protrude upwardly, and a work fixing table is fixed on the top surface of the swiveling table. Reference is made to Japanese Patent Gazette of Japanese Provisional Publication No. 2004-195586 and Japanese Patent Gazette of Japanese Provisional Publication No. 2006-123011.

When machining an oblique hole, such as a lubrication hole of a crankshaft, with the machine tool, an operation is carried out by holding a work horizontal on the top surface of the work fixing table through a work main-axis rotary index support device, turning the swiveling table around a vertical pivot (B axis) and rotating the work around its reference axis through a work support/rotate device as needed to position the oblique hole to be made to extend in the same longitudinal direction as the rotary spindle, and thereafter forwardly moving the work in the longitudinal direction toward a rotating center of the rotary spindle and rotating the rotary spindle and a tool fixed on the tip thereof.

SUMMARY OF THE INVENTION

Problem to be Solved by the Invention

The conventional machine tool has the following problems.

(1) The distance from the top surface of the bed to the position where the tool machines the work is comparatively large, because the swiveling table lies between the work fixing table and the bed. Therefore, it is impossible to enhance the rigidity for supporting the work. Besides, the work is easily displaced due to the cutting resistance of the tool during the machining. Therefore, it is difficult to carry out high precision machining.

(2) When fixing a center of the longitudinal direction of a comparatively long work fixing table on the top surface of the swiveling table, it is necessary to enlarge the size, viewed from the top, of the swiveling table in order to avoid ends of the longitudinal direction of the work fixing table from excessively protruding from the top surface of the swiveling table. Accordingly, the manufacturing cost is increased.

(3) Since a comparatively large swiveling table has a large moment of inertia in turning around the pivot (B axis), it requires a driving source (motor) with a large driving force for moving the swiveling table fast. Therefore, the driving apparatus is made big, and the supplied energy becomes big.

(4) When making the driving source large to move the swiveling table quickly, the inertia of its moving part is increased. If starting and stopping of the movement are frequently repeated, the movement necessarily becomes slow. Therefore, the swivel table can not be effectively speeded up. On the contrary, non-cutting operations take a long time.

The present invention aims to provide a machine tool to resolve the above-mentioned problems.

Means to Solve the Problem

To achieve the above-mentioned aims, a machine tool related to a first embodiment of the invention is so characterized that, in a machine tool having a work moving in a Z axis direction on a stationary body, then machining with a rotary spindle, the machine tool comprises a pair of guide tracks extending in the Z axis direction away from an X axis direction intersecting the Z axis direction on the stationary body section, a pair of feed tables guided by said guide tracks to be movable independently, a support/feed/turn output member for supporting the work, and a control box controlling the rotary spindle machining. In this case, the support/feed/turn output member is arranged between the feed tables so as to bridge them, coupled with one feed table to be relatively rotatable around a line in Y axis direction which intersects both the X axis direction and the Z axis direction perpendicularly, and coupled with the other feed table to be relatively rotatable around the line in the Y axis direction and to be relatively movable in a specific direction related to the positions of both feed tables. The control box changes the facing angle of the work with respect to the rotary spindle by moving the feed tables on the guide tracks so as to change their positions relative to one another, thereafter moving the feed tables on the guide tracks in the state of changed relative positions in a line in the Z axis direction. Here, although the Z axis direction preferably intersects the X axis direction perpendicularly, it can intersect the X axis direction at other angles.

According to a second embodiment of the invention, in a machine tool having a rotary spindle moving in a Z axis direction on a stationary body for machining a work, the machine tool comprises a pair of guide tracks extending in the Z axis direction away from an X axis direction intersecting the Z axis direction on the stationary body, a pair of feed tables guided by the guide tracks to be movable independently, a support/feed/turn output member for supporting the rotary spindle, and a control box. In this case, the support/feed/turn output member is arranged between the feed tables so as to bridge them, coupled with one feed table to be relatively rotatable around a line in a Y axis direction which intersects both the X axis direction and the Z axis direction perpendicularly, and coupled with the other feed table to be relatively rotatable around the line in the Y axis direction and to be relatively movable in a specific direction related to the positions of both feed tables. The control box changes a facing angle of the work relative to the rotary spindle by feeding the feed tables on the guide tracks so as to let their relative positions be different, thereafter feeding them thereon in the state of different relative positions in a line in the Z axis direction.

Effects of the Invention

According to the first embodiment of the invention, the control box feeds the pair of feed tables on the guide tracks so that their relative positions along the line in the Z axis direction are different, thereby changing the facing angle of the work with respect to the rotary spindle, and thereafter feeds the feed tables on the guide tracks in a state in which the different relative positions along the line of the Z axis direction are maintained. As a result, it is possible to feed the work on the guide tracks in the Z axis direction and machine the work in a state in which the work is rotated to be oblique to the spindle. That is, it is possible to carry out positioning the work oblique to the spindle and feed and machine the work with the spindle on the guide tracks in one Z axis direction.

In the second embodiment of the invention, although the relation of the work and the spindle is the opposite of their relation in the first embodiment of the invention, it is possible to carry out positioning the work oblique to the spindle and feeding and machining the work with the spindle on the guide tracks in one Z axis direction.

BRIEF DESCRIPTION OF THE DRAWINGS

FIG. 14A shows a case where a B axis turning motion is performed, and FIG. 14B shows a case where the B axis turning motion is not performed.

FIGS. 15A and 15B show a modification of the machining center, wherein FIG. 15A is a perspective view of a first modified embodiment and FIG. 15B is a perspective view of a second modified embodiment.

FIGS. 16A and 16B show a third modified embodiment of the machining center, wherein FIG. 16A is a perspective view and FIG. 16B is a plan view.

FIGS. 17A and 17B refer to the third modified embodiment, wherein FIG. 17A is a sectional view taken on the line A-A in FIG. 16, and FIG. 17B is a sectional view taken on the line B-B in FIG. 16.

Figure 1:
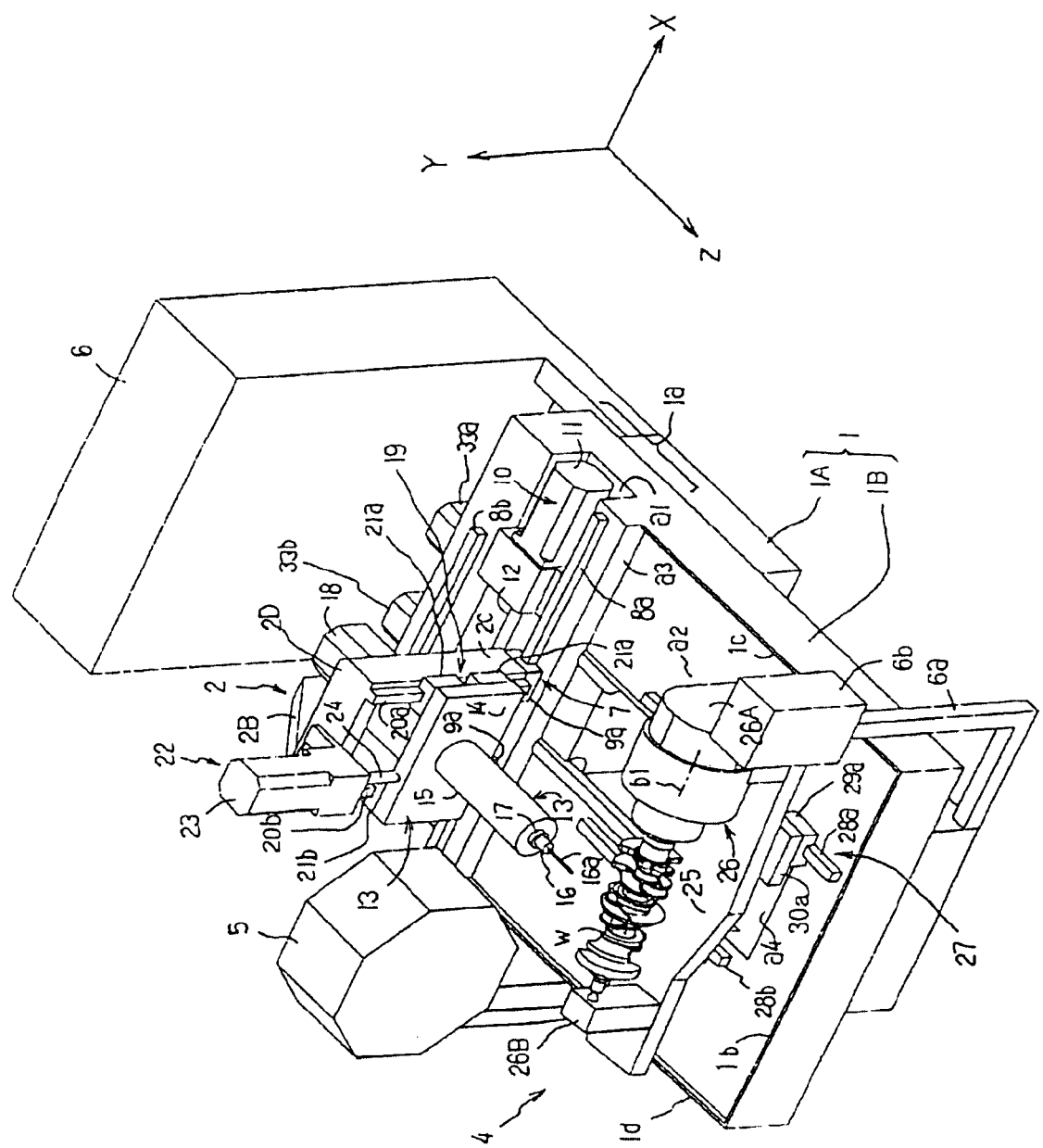
FIG. 1 is a perspective view from the front and above of a machining center of a numerical control machine tool according to the present invention.
Figure 2:
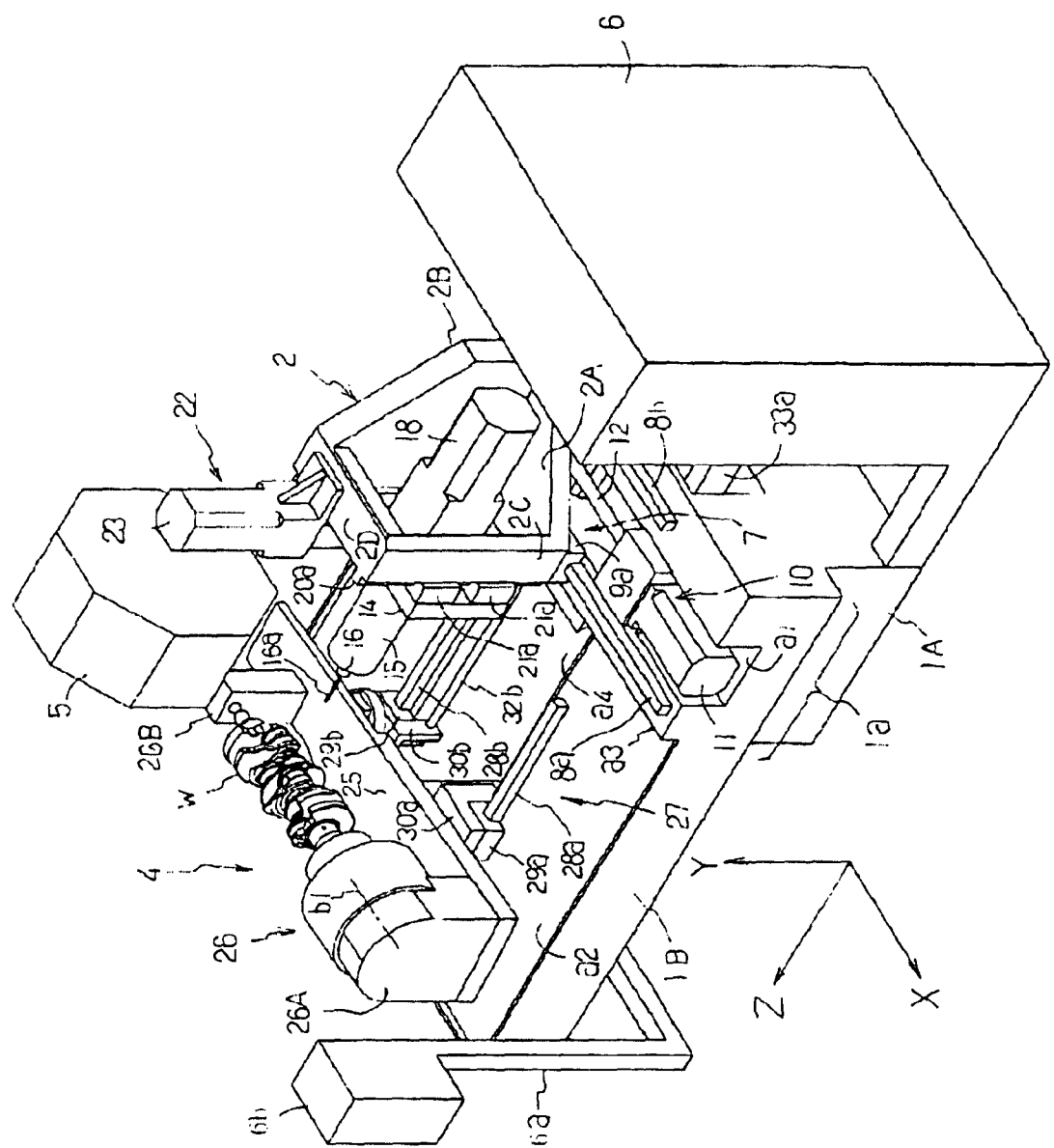
FIG. 2 is a perspective view from the rear and above of the machining center.
Figure 3:
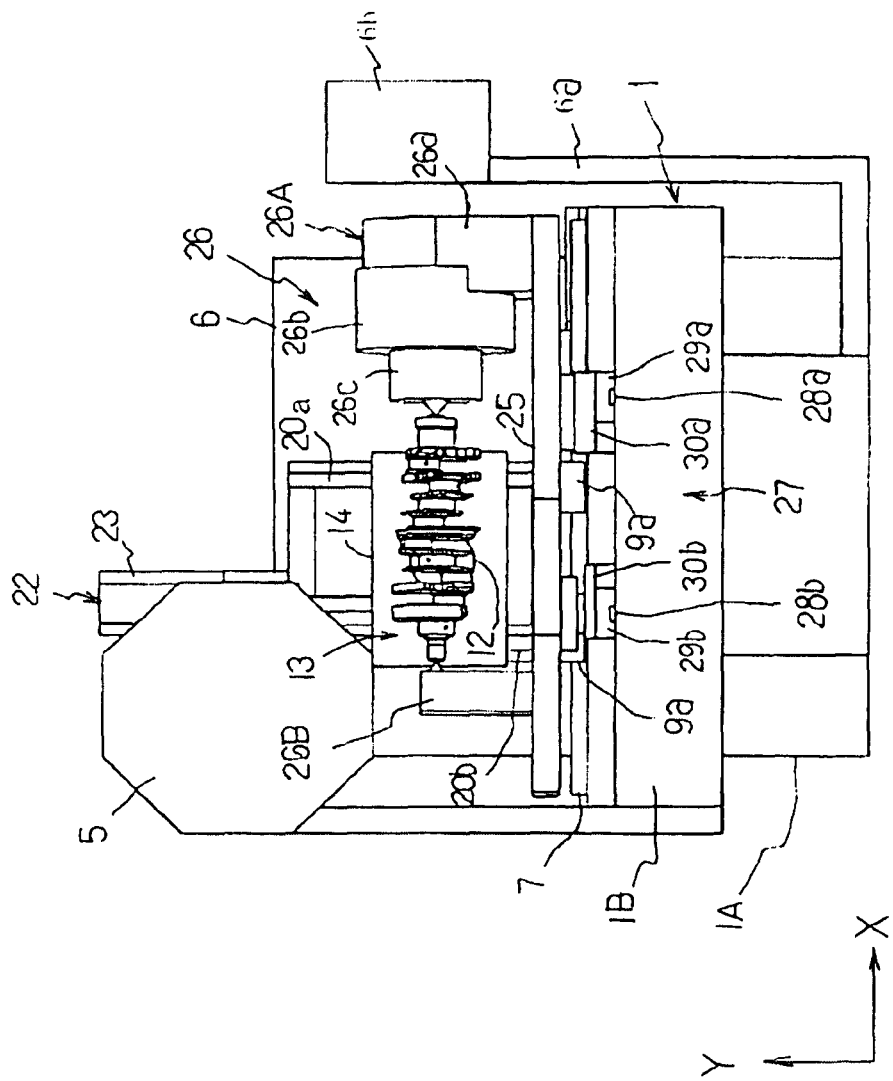
FIG. 3 is a front view of the machining center.

EXPLANATION OF REFERENCE NUMERALS 1 a stationary body section
1*fa* a track supporting section
1*fb* a track supporting section
8*a* a guide track of a rotary spindle 17
8*b* a guide track of a rotary spindle 17
17 a rotary spindle
25 a support/feed/turn output member
25A a work fixing table
28*a* a guide track of a feed table 30*a*
28*b* a guide track of a feed table 30*b*
30*a* a feed table
30*b* a feed table
31*a* a nut (feed mechanism, drive device)
31*b* a nut (feed device, drive means)
32*a* a ball screw (feed mechanism, drive device)
32*b* a ball screw (feed mechanism, drive device)
33*a* a servomotor (drive mechanism 27)
33*b* a servomotor (drive mechanism 27)
35 a means for regulating displacement
d1 a specified direction
a4 a through hole
a5 a through hole

PREFERRED EMBODIMENT OF THE INVENTION

In FIGS. 1 to 5, a bed 1 serves as a stationary body section, and thereon, a column 2, a work supporting section 4 and an ATC device 5 are provided. A controller box 6 is arranged at the rear side of the bed 1, and a computer numerical control gear and hydraulic high-pressure apparatuses are incorporated therein.

Figure 4:
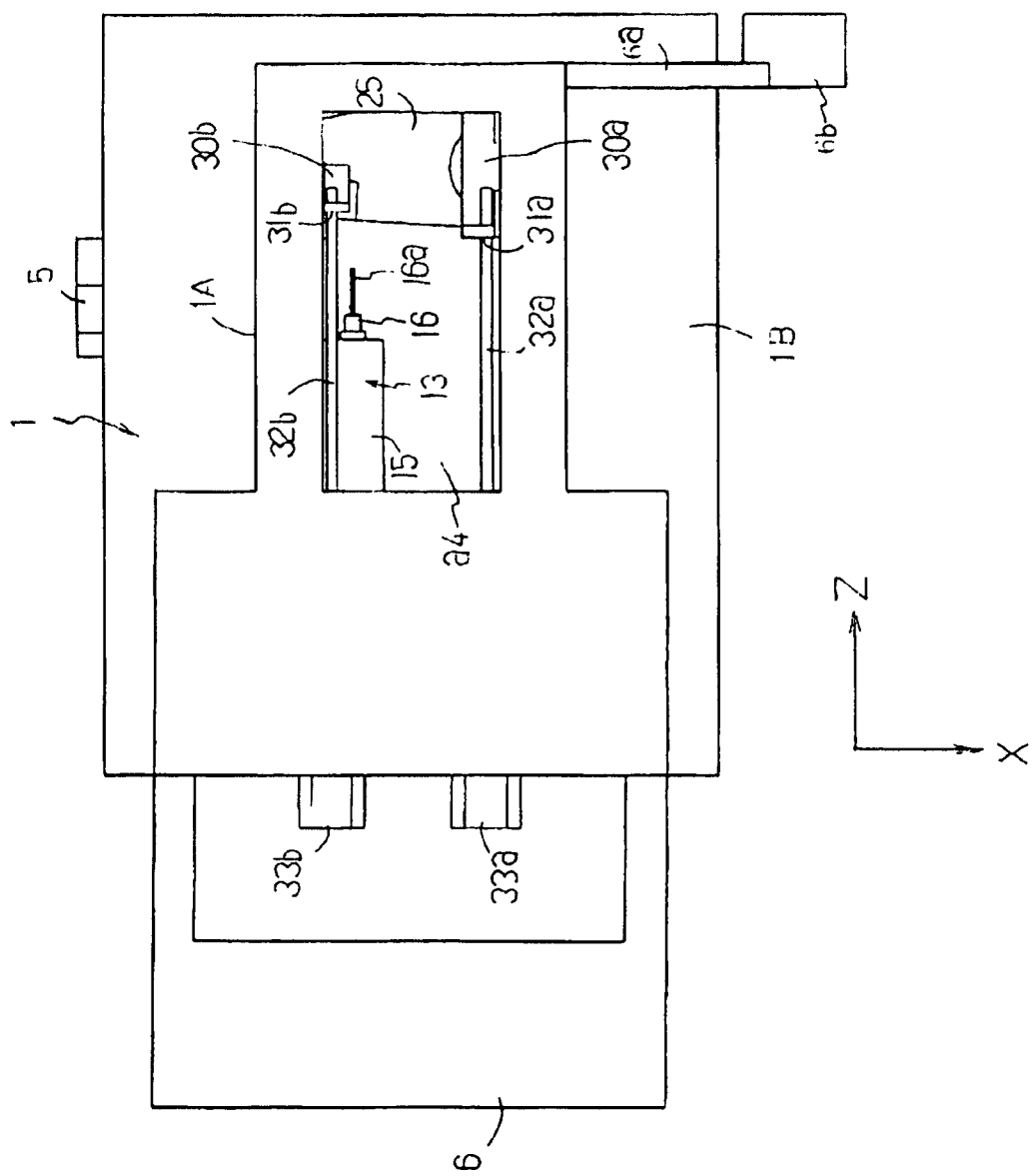
FIG. 4 is a bottom view of the machining center.

The bed 1, as shown in FIG. 4, comprises a leg 1A formed in a 'T' shape viewed from the bottom and a supporting face 1B larger than the leg 1A. The supporting face 1B is formed integrally on the leg 1A. In this case, in the leg 1A, the top portion of the 'T' shape is located at the rear.

The rear portion 1*a* of the supporting face 1B is formed so thick that its top surface is higher than the forward portion thereof by a step. A straight groove a1 having a quadrangle section, which faces a lateral direction (X axis direction), is provided on the top surface in the length of a longitudinal direction (Z axis direction). The supporting face 1B more forward than the rear portion 1*a* has a top surface a2 comprising a broad single horizontal surface. Fences 1*b*, 1*c*, 1*d* that are higher than the top surface a2 are provided at the front edge, the left edge and the right edge of the top surface a2 respectively, and in addition, a front end face a3 of the rear portion 1*a* is located at the rear edge of the top surface a2. Hence, all sides of the top surface a2 rise. A large through hole a4 having a rectangular shape seen from the top is formed in a vertical direction (Y axis direction) in the bed 1 in front of the leg 1A. A supporting bar 6*a* shaped as a hook protrudes from the leg 1A, and a control panel 6*b* for the computer numerical control gear is fixed on the top end of the supporting bar 6*a*.

The column 2 is made in a body having a lower plate 2A shaped as a triangle seen from the top, a left side plate 2B shaped as a trapezoid seen from the side, a right side plate 2C and an upper plate 2D, the column being supported on the rear portion 1*a* of the bed 1 so as to be movable in the lateral direction (X axis direction) through an X axial guide means 7. The X axial guide means 7 has a pair of lateral guide tracks 8*a*, 8*b* on the top surfaces in front of and to the rear of the straight groove a1 of the rear portion 1*a*, comprising a plurality of guided bodies (for example: two guided bodies) 9*a* and at least one guided body 9*b*. The guided bodies 9*a* are provided at left and right positions on the forward bottom surface of the lower plate 2A to be guided by the forward lateral guide track 8a simultaneously. The guided body 9b is provided on the rearward bottom surface of the lower plate 2A (see FIG. 5).

An X axial driving means 10 is provided between the column 2 and the groove a1. The driving means 10 comprises a servomotor 11, a ball screw 12 and a not-illustrated nut for the column. The servomotor 11 is fixed at the right end of the groove a1. The ball screw 12 is laterally connected to the output shaft of the servomotor 11 and arranged in the groove a1. The not-illustrated nut for the column is fixed on the bottom surface of the lower plate 2A, and therein the ball screw 12 is screwed. The servomotor 11 is rotated by the computer numerical control gear in the control box 6. Accordingly, the column 2 moves laterally on the guide tracks 8a, 8b through the ball screw 12 and the nut for the column.

A spindle device 13 is supported by the column 2 to be movable in the vertical direction (Y axis direction), comprising a support plate 14 movable in the Y axis direction, a Z axial spindle guide cylinder 15, a rotary spindle 17 and a spindle motor 18. The support plate 14 comprises a plane parallel to both the X axis direction and the Y axis direction. The cylinder 15 is fixed at almost the center of the support plate 14 so as to protrude forward. The rotary spindle 17 is inserted into the cylinder 15 so as to freely rotate, having an exchangeable tool holder 16 on the front end. The spindle motor 18 is fixed on the rear of the support plate 14 in a body, giving rotation driving force to the rear end of the rotary spindle 17. The support plate 14 is arranged at the front surface of the column 2, being guided to be movable in the vertical direction (Y axis direction) on the column 2 through a Y axial guide means 19. The guide means 19 has a pair of left and right vertical guide tracks 20a, 20b provided on the front end face of the left side plate 2B and the front end face of the right side plate 2C, comprising a plurality of guided bodies 21a (for example two) and a plurality of guided bodies 21b (for example two). The guided bodies 21a are provided at a plurality of upper and lower portions (for example two) of the rearward right end of the support plate 14 to be guided by the right vertical guide means 20a simultaneously. The guided bodies 21b are provided at a plurality of upper and lower portions (for example two) of the rearward left end of the support plate 14 to be guided by the left vertical guide means 20b simultaneously.

A Y axial driving means 22 is provided between the column 2 and the spindle gear 13. The driving means 22 comprises a servomotor 23, a ball screw 24 and a not-illustrated nut for the spindle gear. The servomotor 23 is fixed at the left portion of the top surface of the upper plate 2D. The ball screw 24 is connected to the output shaft of the servomotor 23 and arranged vertically. The not-illustrated nut for the spindle gear is fixed to the rear surface of the support plate 14, and therein, the ball screw 24 is screwed. The servomotor 23 is rotated by the computer numerical control gear in the control box 6. Accordingly, the spindle gear 13 moves vertically on the guide tracks 20a, 20b through the ball screw 24 and the nut for the spindle gear.

The work supporting section 4 comprises a work fixing table 25A and a work main-axis rotary index support mechanism 26. The work fixing table 25A is a support/feed/turn output member 25 comprising a long horizontal plane plate in the lateral direction (X axis direction). The index support mechanism 26 is provided on the top surface of the work fixing table 25A, comprising a work rotary index drive gear 26A and a tailstock 26B. The index drive gear 26A and the tailstock 26B are respectively fixed on the right and left ends of the top surface of the work fixing table 25A so as to be facing one another.

Figure 6:
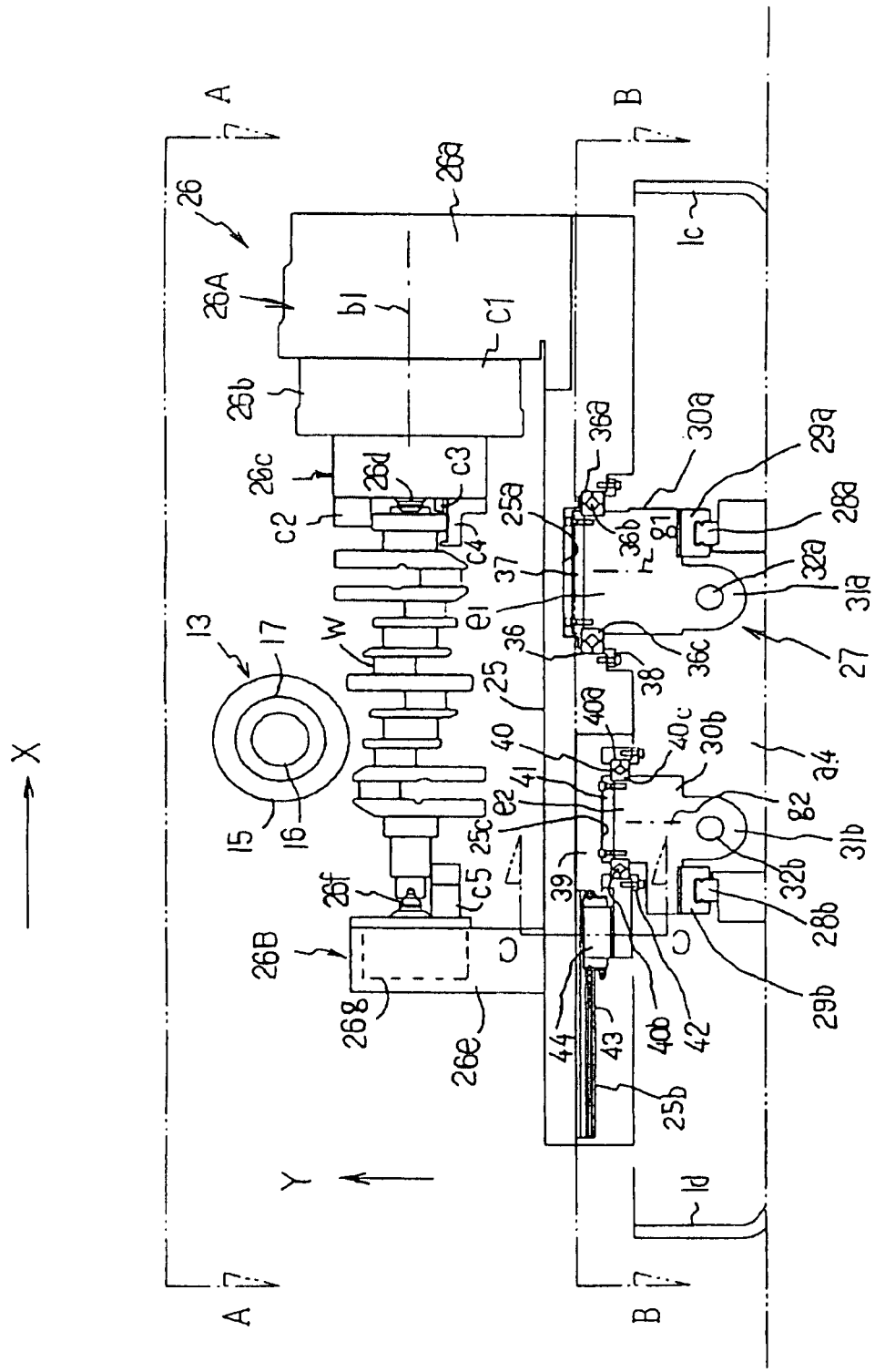
FIG. 6 is a partial front view of a work supporting section of the machining center.
Figure 7:
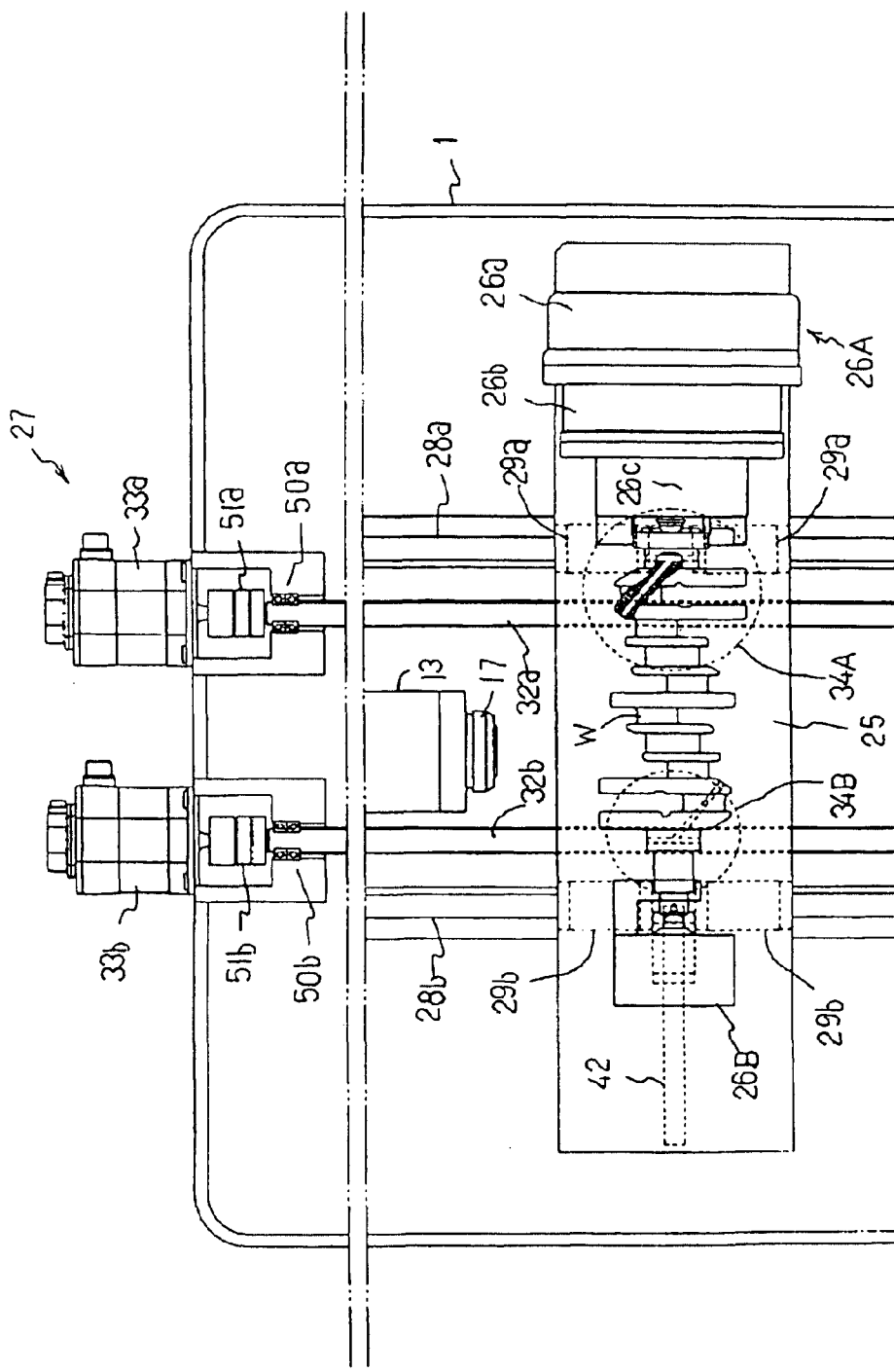
FIG. 7 is a sectional view taken on the line A-A in FIG. 6.
Figure 8:
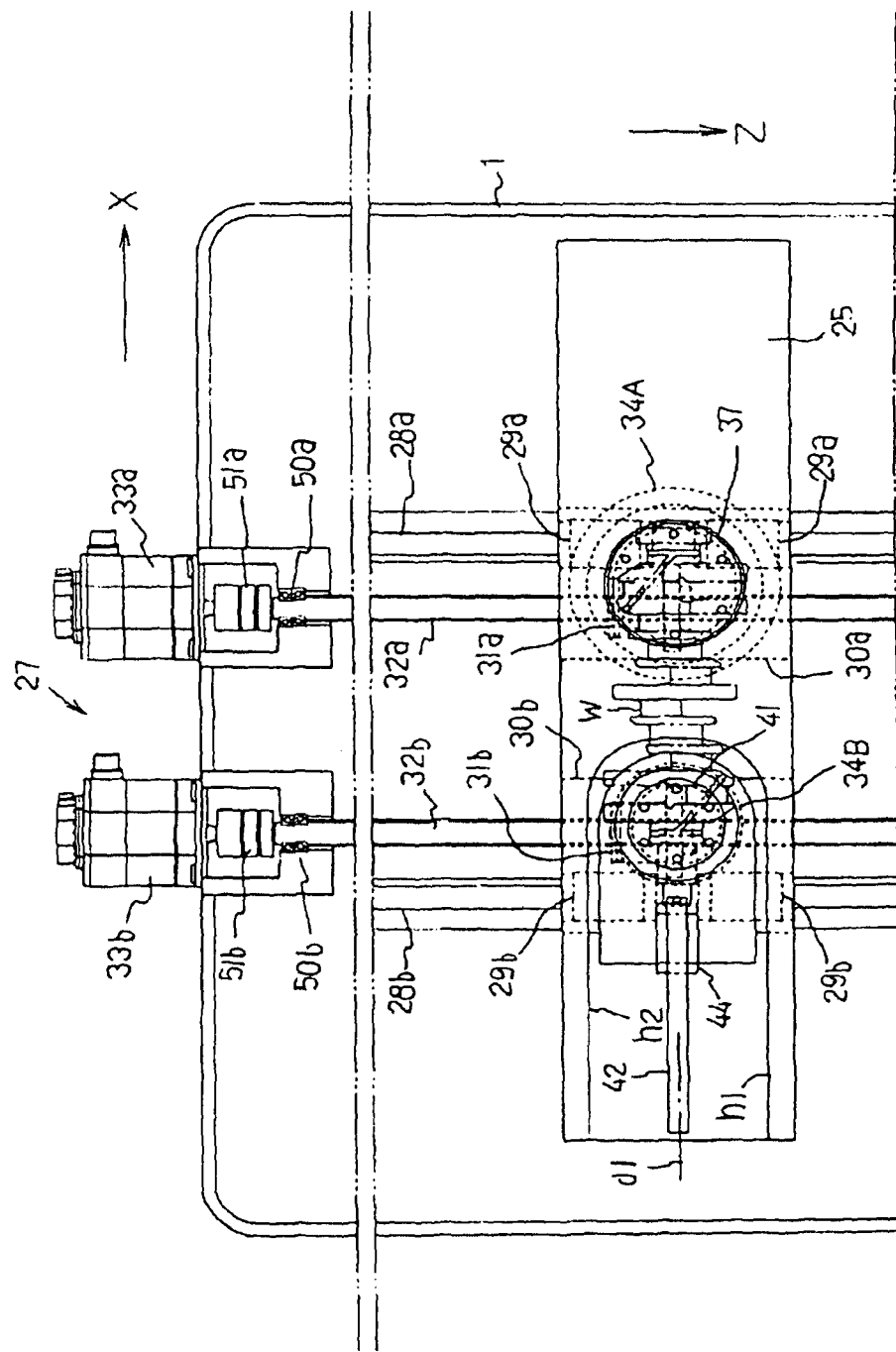
FIG. 8 is a sectional view taken on the line B-B in FIG. 6.

The index drive gear 26A, as shown in FIG. 6, comprises a main body 26a, an index/rotate output portion 26b, a chuck 26c and a drive-side center 26d. The main body 26a is fixed on the work fixing table 25A so as to stand with the index/rotate output portion 26b on one side surface. Here, the index/rotate output portion 26b rotates around a specific horizontal axis b1. The chuck 26c is coupled concentrically with the index/rotate output portion 26b to be rotated with it. The drive-side center 26d is supported by the main body 26a concentrically with the horizontal axis b1, and is received in a hole formed at a rotating center of one end surface of a work w clamped by the chuck 26c, the drive-side center 26d supporting the work w.

An extension of the horizontal axis b1 is spaced from the top surface of the work fixing table 25a by a fixed distance within a range between the index drive gear 26A and the tailstock 26B. The distance is made larger than one required when the biggest scheduled work w is rotated around the horizontal axis b1 on the top surface of the work fixing table 25A.

The chuck 26c is movable in a radial direction of a chuck main body c1, having a plurality of claws c2 for holding the work w on the horizontal axis b1. An axial positioning member c3 is fixed on the chuck main body c1 to position the work w on the horizontal axis b1. A temporary accepting member c4 is fixed on the chuck main body c1 to temporarily support one end of the chuck 26c side of the work w when the chuck main body c1 is located at the reference position around the horizontal axis b1.

The tailstock 26B comprises a main body 26e fixed on the top surface of the work fixing table 25A, a tailstock center 26f supported by the main body 26e so as to slide freely, and a center driving gear 26g for pressing the center 26f in the horizontal axis b1 direction. When the center driving gear 26g presses the center 26f, the work w is held between the drive-side center 26d or the positioning member c3 of the index drive gear 26A and the tailstock center 26f of the tailstock 26B, and pressed to be supported such that the center 26f is received in a center hole of the rotating center of the end surface of the tailstock 26B side of the work w. A temporary accepting member c5 is fixed just below the center 26f to temporarily support the end of the tailstock 26B side of the work w stably.

The work fixing table 25A is controlled by a support driving device 27 which has a function of turn-driving around the imaginary pivot (B axis) in the vertical direction, a Z axial driving function, and a horizon keeping function which keeps the top surface of the work fixing table 25A parallel to both the X axis direction and the Z axis direction. The support driving device 27, as shown FIGS. 6 to 9, comprises a pair of guide tracks 28a, 28b in the longitudinal direction (Z axis direction), two front and rear guided bodies 29a, 29b, feed tables 30a, 30b, nuts 31a, 31b, ball screws 32a, 32b, and servomotors 33a, 33b. The guide tracks 28a, 28b extend in positions separated from one another in the lateral direction (X axis direction) of the top surface of the bed 1. The guided bodies 29a, 29b are supported by the guide tracks 28a, 28b, respectively, to be movable in the Z axis direction. The feed table 30a is supported by the guide track 28a through the guided bodies 29a, 29a, and the feed table 30b is supported by the guide track 28b through the guided bodies 29b, 29b. The nuts 31a, 31b are longitudinally fixed to the lower parts of the feed tables 30a, 30b, respectively. The ball screws 32a, 32b are screwed into the nuts 31a, 31b through balls, respectively. The servomotors 33a, 33b separately give rotations to each of the ball screws 32a, 32b. The work fixing table 25A is bridged between the feed tables 30a, 30b. The feed table 30a is coupled to one end of the work fixing table 25A through a first coupled portion 34A to be relatively rotatable around a vertical axis (Y axis direction). The feed table 30b is coupled to the other end of the work fixing table 25A through a second coupled portion 34B to be relatively rotatable around a vertical axis (Y axis direction) and to be relatively movable in a specific direction d1 in relation to the positions of the feed tables 30a, 30b. In addition, a displacement regulating device 35 for regulating relative displacement (see FIG. 9) in the specific direction d1 (preferably corresponding to the horizontal axis b1 direction) is provided.

The first coupled portion 34A has a shaft section e1, a shaft hole 25a, a roller bearing 36c, a disk 37 and a ring member 38. The shaft section e1 protrudes from the center of the feed table 30a, which is formed in a square shape viewed from the top. The shaft hole 25a in which the shaft section e1 is inserted is formed in the bottom of the work fixing table 25A. The roller bearing 36 comprises an outer ring 36a, a roller 36b and an inner ring 36c, the roller bearing being tightly interfitted between the shaft hole 25a and the shaft section e1. The disc 37 is screwed on the shaft section e1 to restrict the inner ring 36c from withdrawing from the shaft section e1. The ring member 38 is screwed to the bottom of the work fixing table 25A to restrict the outer ring 36a from withdrawing from the shaft hole 25a. Here, the disk 37 and the ring member 38 restrict the shaft section e1 from withdrawing downwardly. The feed table 30a and the work fixing table 25A are coupled to be relatively rotatable only around a line g1 in the vertical direction (Y axis direction) of a centerline of the shaft section e1.

The second coupled portion 34B has a shaft section e2, a shaft hole 25c, a roller bearing 40, a disk 41 and a ring member 42. The shaft section e2 protrudes from the center of the feed table 30b, which is formed in square shape viewed from the top. The shaft hole 25c in which the shaft section e2 is inserted is formed in the bottom of a sliding intermediate 39, which is arranged inside a groove 25b of the bottom of the work fixing table 25A. The roller bearing 40 comprises an outer ring 40a, a roller 40b and an inner ring 40c, the roller bearing 40 being tightly interfitted between the shaft hole 25c and the shaft section e2. The disc 41 is screwed to the shaft section e2 to restrict the inner ring 40c from withdrawing from the shaft section e2. The ring member 42 is screwed to the bottom of the work fixing table 25A to restrict the outer ring 40a from withdrawing from the shaft hole 25c. Here, the shaft section e2 is restricted from withdrawing downwardly. The feed table 30b and the sliding intermediate 39 are coupled to be relatively rotatable only around a line g2 in the vertical direction (Y axis direction) of a centerline of the shaft section e2. The sliding intermediate 39 comprises a guide track 43 and a guided body 44, being guided in the specific direction d1. The guide track 43 is fixed on the bottom of the groove 25b in the specific direction d1. The guided body 44 is fixed on the top of the sliding intermediate 39, being guided by the guide track 43 and restricted from withdrawing.

The diameter of the shaft section e2 or the roller bearing 40 is smaller than that of the shaft section e1 or the roller bearing 36 because the weight supported by the former is smaller than that of the latter. The specific direction d1 means a direction of a horizontal line connecting the center of the shaft section e1 of the first coupled section 34A and the center of the shaft section e2 of the second coupled section 34B. The guide track 43 is fixed to the horizontal line so as to be in line or parallel, and the number of guide tracks may be one or a plurality as shown in figures.

Figure 9:
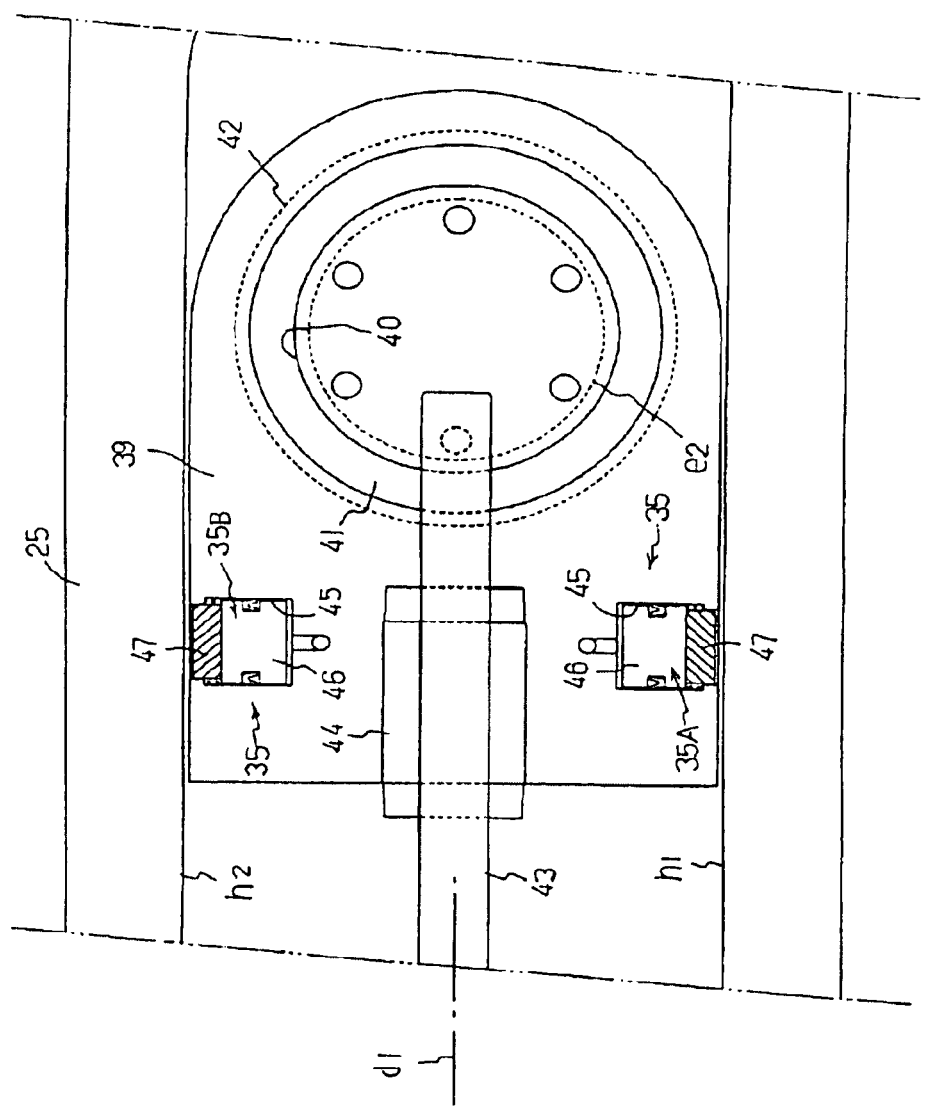
FIG. 9 is an enlarged sectional view seen from the top, showing the circumference of a second connecting portion of the machining center.
Figure 10:
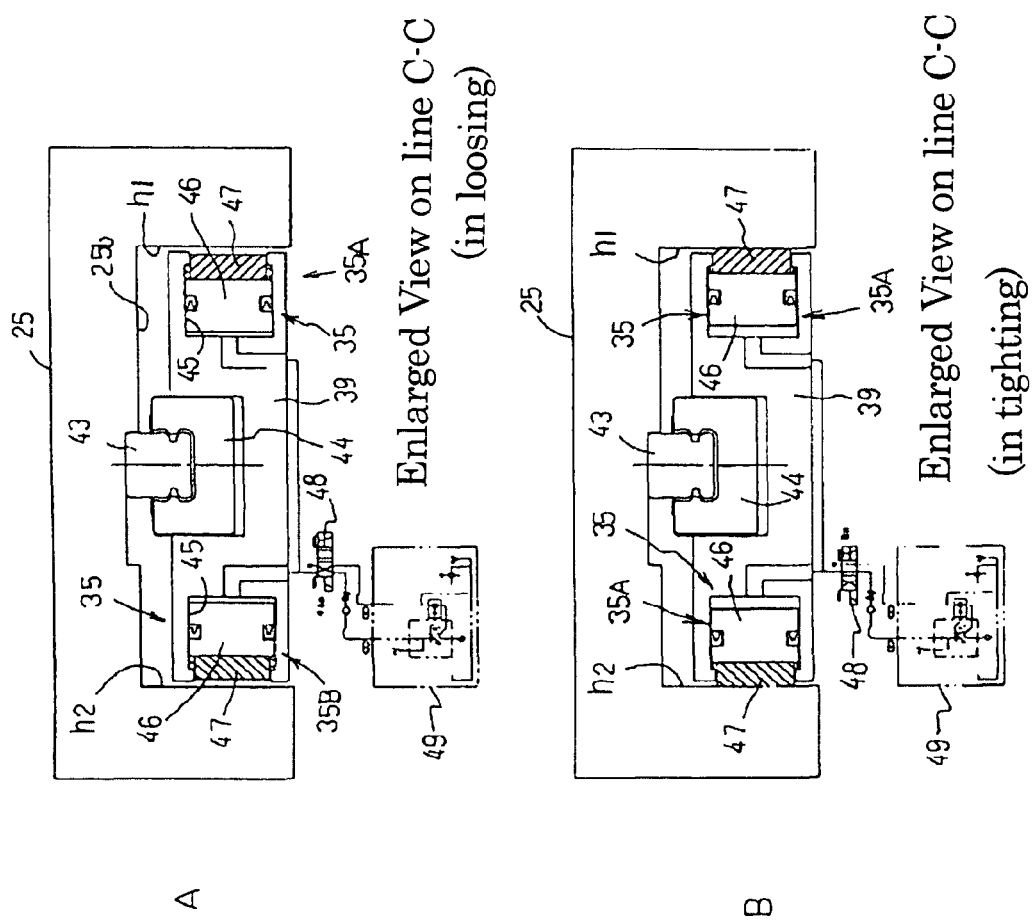
FIGS. 10A and 10B are enlarged sectional views taken on line C-C in FIG. 6.

The displacement regulating device 35 is, as shown in FIGS. 9 and 10, provided on the sliding intermediate 39, comprising press rock means 35A, 35B which are symmetrically arranged at two positions at the sides of the guided body 44. Each of the press rock means 35A, 35B has a hole 45, a piston 46 and a friction plate 47. The piston 46 is inserted into the hole 45, having the outer circumference fitted externally with a seal. The friction plate 47 is fixed at the tip of the piston 46. When a valve 48 is switched to an oil supply position due to an order of the computer numerical control gear, hydraulic oil is fed from an external hydraulic oil supply gear 49 into a cylinder chamber through the control valve 48. The cylinder chamber terminates in the hole 45 and the piston 46 so as to be sealed up. As shown in FIG. 10B, the piston 46 is pushed out externally, the friction plate 47 is pressed against the side surfaces h1, h2 facing oppositely across the groove 25b of the sliding intermediate 39, and the friction between the friction plates 47, 47 restricts the sliding intermediate 39 from being displaced on the guide track 43. Contrarily, when the valve 48 is moved to an oil exhaust position due to an order of the computer numerical control gear, the hydraulic oil inside the cylinder is exhausted toward the hydraulic oil supply gear 49. According to this, the force for pushing the piston 46 out externally is removed, and the friction plate 47 is no longer pressed against the side surfaces h1, h2 as shown in FIG. 10A. Therefore, the frictional force between the friction plates 47, 47 is removed, and the sliding intermediate 39 is released from restriction in its displacement on the guide tracks 43.

The ball screws 32a, 32b are longitudinally arranged in a longitudinal hole which is formed in the rear portion 1a of the bed 1, in addition to the through hole a4, the portions of the ball screws having the rearward screw ends are supported to be freely rotatable through bearings 50a, 50b, which are fixed on the bed 1, and the front portions are screwed into the nuts 31a, 31b of the feed tables 30a, 30b. In this case, the front ends of the ball screws 32a, 32b may be supported through bearings that are fixed on the bed 1. The servomotors 33a, 33b are fixed on the upper portion of the rear surface of the bed 1 behind the ball screws 32a, 32b, and the output axes of the servomotors 33a, 33b are correspondingly combined with the rear ends of the ball screws 32a, 32b through the couplings 51a, 51b. As an alternative, the servomotors 33a, 33b may be fixed on the front face of the bed 1 and the output axes combined with the correspondent ball screws 32a, 32b.

The servomotors 33a, 33b can be located within a range of the thickness of the bed 1. One of the servomotors 33a, 33b can be combined with the forward end of the ball screw 32a or 32b, and the other can be combined with the rearward end of the other ball screw 32b or 32a. The right and left servomotors 33a, 33b and the right and left ball screws 32a, 32b can be located at different heights on the right and left sides respectively. The screw direction of the ball screws 32a, 32b may be selected to be either right screw or left screw. The rotating directions of the servomotors 33a, 33b are also appropriately selected in accordance with the kind of the screws.

Figure 11:
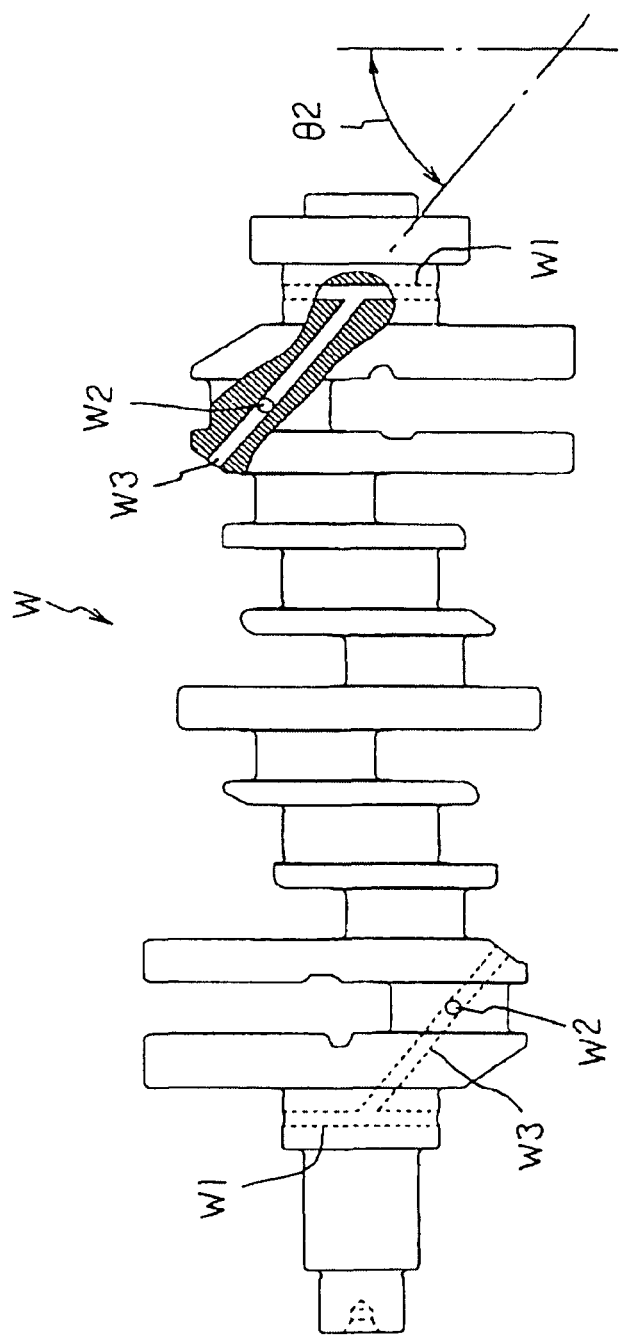
FIG. 11 is a front view of a work.

The following example explains the case where a crankshaft of a work shown in FIG. 11 is machined by the above-mentioned machining center.

Figure 5:
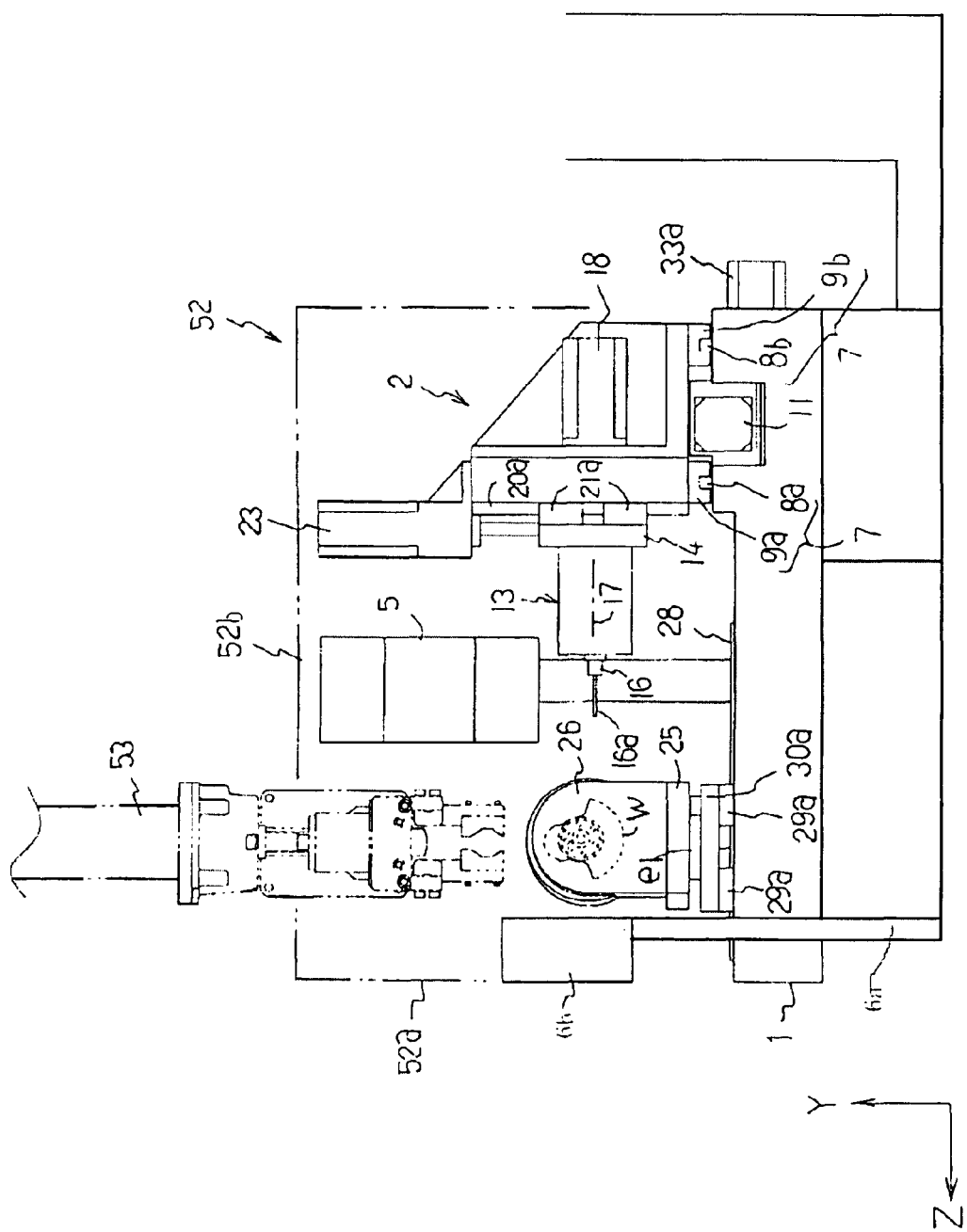
FIG. 5 is a right side view of the machining center.

When loading a crankshaft w on the work fixing table 25A, a switch of the operating panel 6b is operated to work the servomotors 33a, 33b so as to locate the work fixing table 25A at the most forward position on the bed 1 as shown in FIGS. 1 and 5, and so as to situate the horizontal axis b1 parallel to the lateral direction (X axis direction) (This state is a standard condition of the work fixing table 25A.). In this condition, an operator approaches the support device 26 from the front side of the bed 1 and positions the crankshaft w between the drive-side center 26d and the tailstock center 26f, temporarily placing it on temporary table members c4, c5 by hand or robot. Then, the tailstock center 26f is displaced toward the drive-side center 26d by operating the center driving gear 26g. The tailstock center 26f and the drive-side center 26d are respectively inserted into center holes which are formed in the end surfaces of the crankshaft w, sandwiching both ends of the crankshaft w therebetween. At the same time, the crankshaft w is pressed against the axial positioning member c3. Thereafter, the chuck 26c and the claws c2 are displaced so that the claws c2 grasp the outer periphery of the shaft section of one end of the crankshaft w. According to this, the center of the journal portion of the crankshaft w is aligned with the horizontal axis b1, and the positioning of a central direction of the journal portion is carried out.

In loading such a crankshaft w, the top of the bed 1 is covered with a box casing 52. Therefore, when the crankshaft w is loaded by hand, as shown in FIG. 5, an open or closed entrance of the front surface 52a of the casing 52 is temporarily opened, and then the loading is carried out. On the other hand, when the crankshaft is loaded by a robot, an open or closed entrance of the top surface 52b of the casing 52 is automatically opened, and then the loading is carried out by a robot arm 53 moving into the casing 52.

Next, the computer numerical control gear is operated by operating the operating panel 6b, the index drive gear 26A is operated, and the crankshaft w is rotated. Then, a standard position of the crankshaft was to its rotation angle around the horizontal axis b1 is decided according to the same conventional technique as disclosed in Japanese patent laid-open application No. 10-244434. Thereafter, the servomotors 11, 23, 33a, 33b, the index device gear 26A, and the spindle motor 18 are operated by the operating panel 6b or the computer numerical control gear so as to control the phase angle around the horizontal axis b1 of the crankshaft w, the position around the pivot (B axis) of an imaginary vertical axis, the longitudinal (Z axial) position, and vertical and lateral positions of the rotary spindle 17, and to rotate the rotary spindle 17 appropriately, and supply coolant to a machining portion of the crankshaft w. In this way, machining of the crankshaft w begins.

For example, as shown in FIG. 11, when processing lubrication holes w1, w2 in a radial direction of the crankshaft w, the servomotors 33a, 33b are synchronously rotated when the work fixing table 25A is in a standard condition, to move the feed tables 30a, 30b in the Z axis direction with the work fixing table 25A by a screw action. Therefore, the centers of the shaft sections e1, e2 are kept in a relationship in which they are located on the same line in the lateral direction (X axis direction), and the crankshaft w is moved to the required position in the longitudinal direction (Z axis direction) with the work fixing table 25A as the horizontal axis b1 is in X axis direction.

The computer numerical control gear calculates a rotation angle around the horizontal axis b1 of the crankshaft w so that the lubrication holes w1, w2 are parallel to the horizontal surface, in accordance with positional information of the lubrication holes w1, w2 which the operator has already decided on and inputted. Thereafter, the computer numerical control gear rotates the index drive gear 26A by the calculated rotation angle, and the crankshaft w is integrally rotated by the chuck 26c. The rotation angle is calculated from the angle positions around the horizontal axis b1 of a plane including both the center lines and the horizontal axes b1 of the lubrication holes w1, w2 and the current position around the horizontal axis b1 of the crankshaft w. Accordingly, the lubrication holes w1, w2 are parallel to the horizontal surface and in the Z axis direction of the rotary spindle 17.

On the other hand, the servomotors 11, 23 are operated to move the column 2 and the spindle device 13 as needed. The rotary spindle 17 is moved in the lateral direction (X axis direction) and the vertical direction (Y axis direction) as needed, and a tool (long drill) 16a fixed on the tool holder 16 faces in the direction of the lubrication hole w1 to be machined. Thereafter, the displacement regulating device 35 regulates the displacement of the work fixing table 25A and the sliding intermediate 39 to stabilize the position of the work fixing table 25A on the bed 1. Besides, the servomotors 33a, 33b are further synchronously rotated to move the crankshaft w in the Z axis direction only. During this movement, the tool 16a engages a journal or crankpin of the crankshaft w, machining the lubrication holes w1, w2 in the radial direction.

Next, machining a slant lubrication hole w3, shown in FIG. 11, is carried out as follows. In the situation in which the work fixing table 25A is located at the standard position that is the same as in the previous example, the servomotors 33a, 33b are synchronously rotated in the same direction to move the feed tables 30a, 30b in the Z axis direction with the work fixing table 25A by a screw action. Accordingly, the centers of the shaft sections e1, e2 are kept in a relationship in which they are located on the same line in the lateral direction (X axis direction), and the crankshaft w is moved to the required position in the longitudinal direction (Z axis direction) with the work fixing table 25A as the horizontal axis b1 is in the X axis direction.

Figure 12:
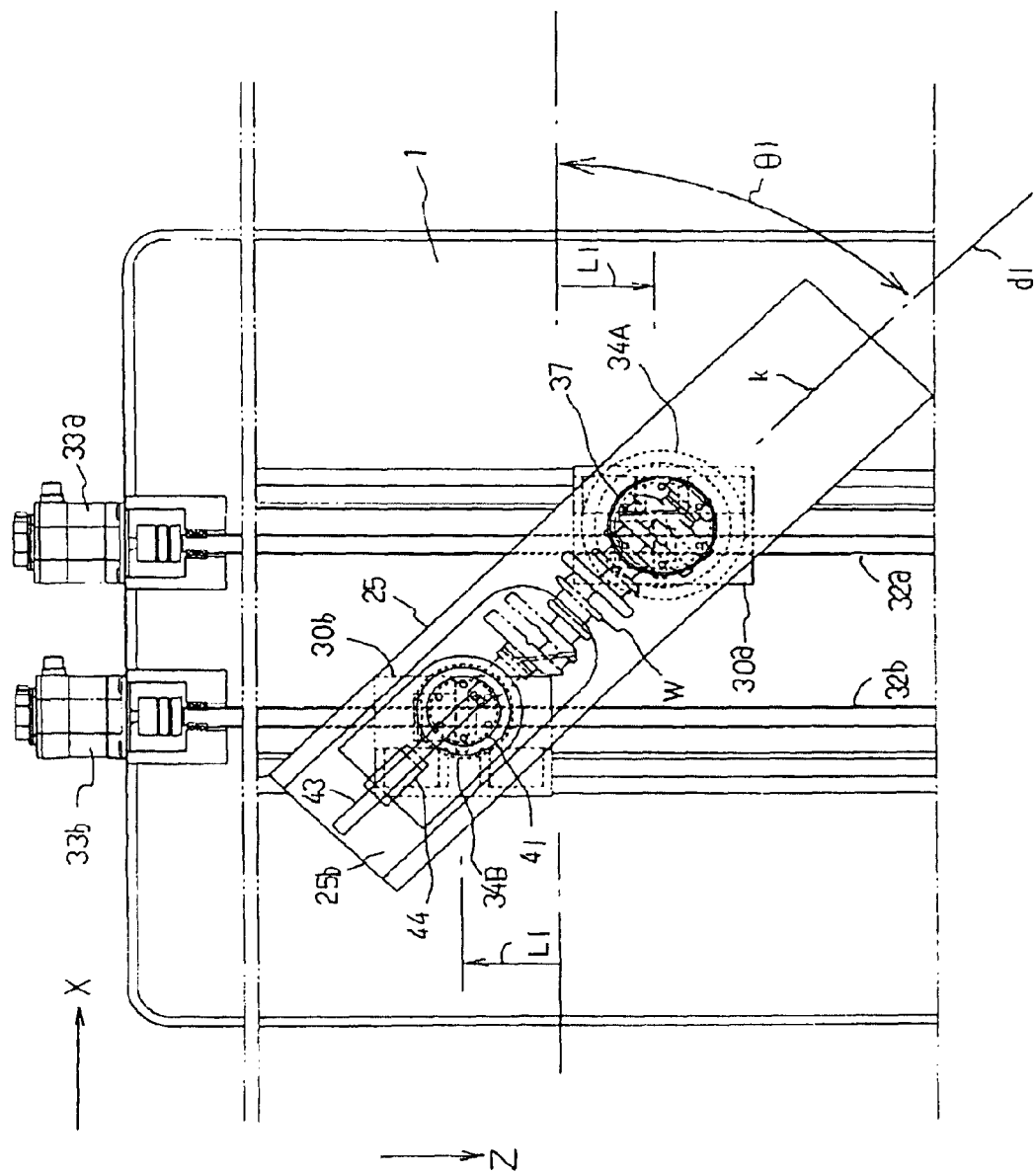
FIG. 12 is a partial plan view of the machining center, showing a work fixing table 25A turned around a line in the Y axis direction.

Thereafter, the servomotors 33a, 33b are rotated in opposite directions to each other under the condition that the synchronization is released. As shown in FIG. 12, the feed tables 30a, 30b are moved in opposite directions in the Z axis direction by the screw action. The shaft sections e1, e2 are arranged symmetric with respect to an intermediate point of a segment linking centers of them, being spaced from a line k in the X axis direction to the Z axis direction through the intermediate point by the same distance L1. According to this, the work fixing table 25A is horizontally turned by an angle $\theta_1$ around the shaft section e1 against the feed table 30a as well as the imaginary pivot in the Y axis direction through the intermediate point against the bed 1. The horizontal axis b1 is also horizontally turned the same as the work fixing table 25A is turned. The main members that cause inertial resistance against the horizontal slewing motion of the work fixing table 25A are the work fixing table 25A, the support device 26, the crankshaft w, the feed tables 30a, 30b, the sliding intermediate 39, the ball bearings 36, 40, the discs 37, 41 and the rings 38, 42. The gross weight of them is considerably smaller than that of the conventional swiveling table. Accordingly, the inertial resistance against the same acceleration is considerably smaller than that of conventional swiveling tables, thereby accelerating the movements of the work fixing table 25A with comparatively small power.

When the work fixing table 25A is horizontally turned, the distance between the shaft sections e1, e2 is changed, but the work fixing table 25A can smoothly turn horizontally, because the change is absorbed by the sliding intermediate 39 being guided by the guide track 43 to be displaced in the specific direction d1. The swiveling angle in the horizontal turn is decided from an angle $\theta_2$ of inclination, in plan, of the lubrication hole w3, which has been already designed. When the operator inputs the angle $\theta_2$, the computer numerical control device calculates a rotational amount of the servomotors 33a, 33b, operating the servomotors 33a, 33b according to the calculation, then horizontally turning the work fixing table 25A by a specific angle corresponding to the angle $\theta_2$. The specific angle is calculated from the current angle position corresponding to the horizontal axis b1 and the angle θ 2 on the plane including both the center line of the lubrication hole w3 and the horizontal axis b1. Then, the displacement regulating means 35 controls the relative displacement between the work fixing table 25A and the sliding intermediate 39 to fix the position of the work fixing table 25A on the bed 1.

When the operator inputs the position information of the lubrication hole w3 which has been already designed, the computer numerical control device calculates the rotation angle around the horizontal axis b1 of the crankshaft w so that the lubrication hole w3 is parallel to the horizontal surface. Then, the computer numerical control device rotates the index drive gear 26A by the calculated rotation angle, besides rotating the crankshaft w through the chuck 26c. The rotation angle is calculated from the angle position around the horizontal axis b1 of the plane including both the center lines of the lubrication holes w3 and the horizontal axis b1 and the current position around the horizontal axis b1 of the crankshaft w. According to this, the lubrication holes w3 are parallel to the horizontal surface, besides extending in the Z axis direction of the rotary spindle 17.

On the other hand, the servomotors 11, 23 are operated as needed to work the column 2 and the spindle device 13. Accordingly, the rotary spindle 17 is moved in the lateral direction (the X axis direction) or the vertical (the Y axis direction) direction, having the tool (long drill) 16a fixed on the tool holder 16 facing each of the lubrication holes w3. Thereafter, the servomotors 33a, 33b synchronously rotate in the same direction, having the crankshaft w moving only in the Z axis direction. During this movement, the tool 16a machines the lubrication holes w3 inclined from the crankpin of the crankshaft w to the journal.

After finishing machining the lubrication holes w3, all parts work in reverse order relative to the conventional operation, and the work fixing table 25A is moved to the standard position. Thereafter, the crankshaft w on the work fixing table 25A is unloaded to outside the casing 52 by hand or robot.

Figure 13:
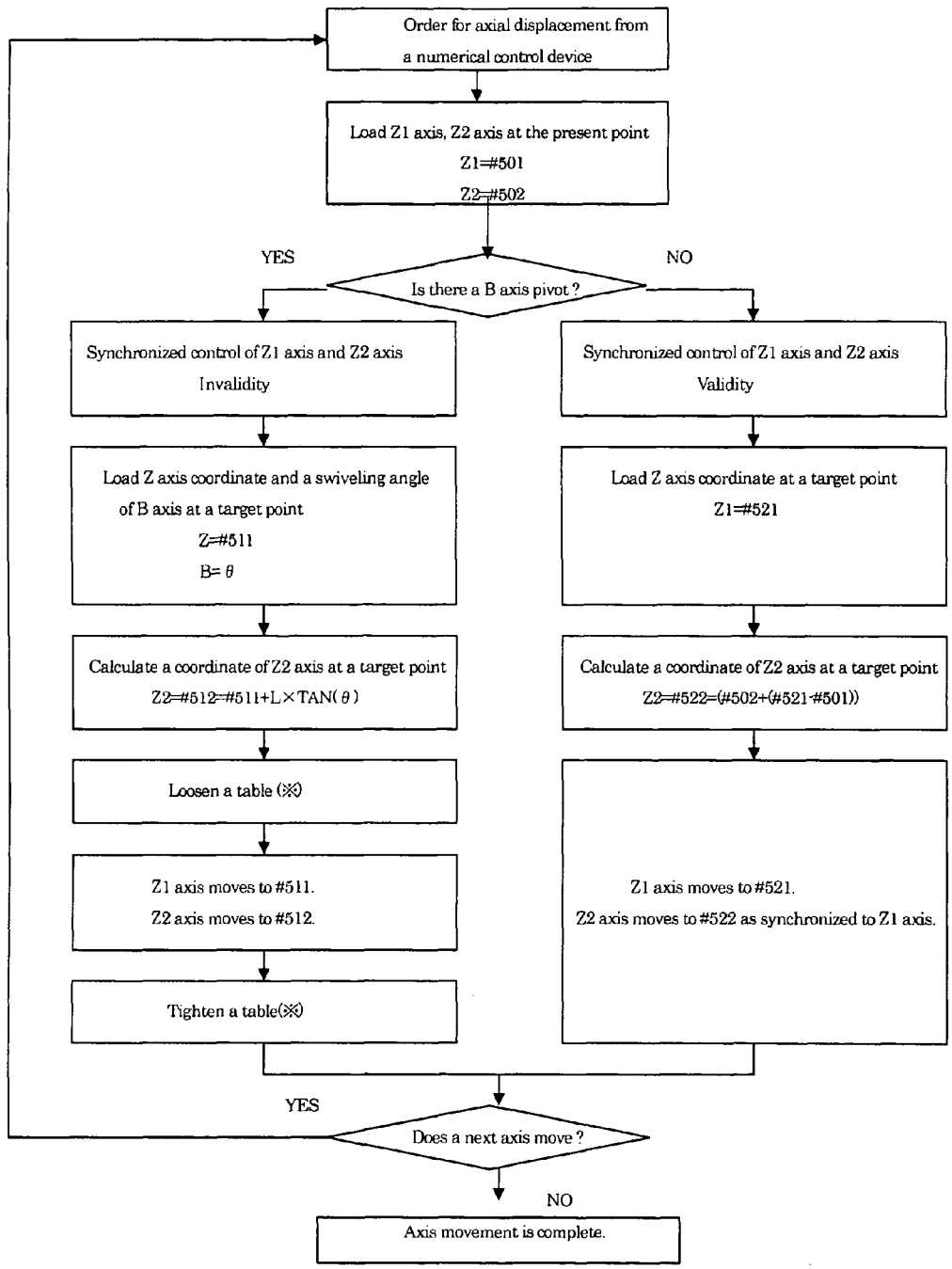
FIG. 13 is a flow diagram showing an example of control by a computer numerical control gear of the machining center.
Figure 14:
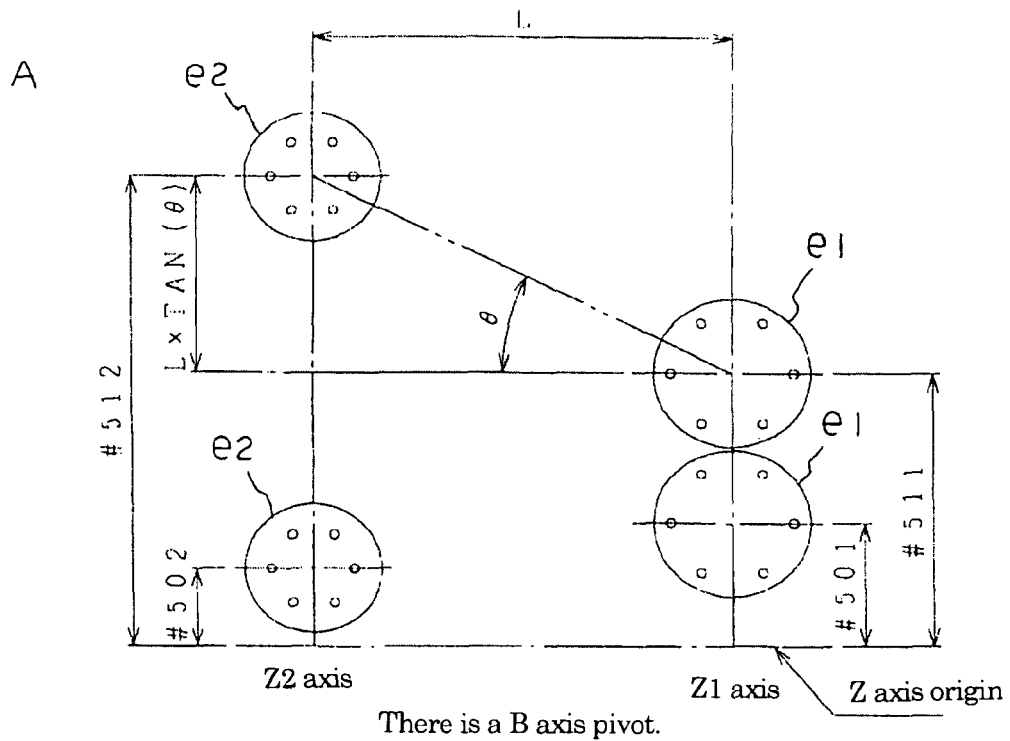
FIGS. 14A and 14B are views explaining movement of an axis portion corresponding to the flow diagram in FIG. 13.
Figure 14:
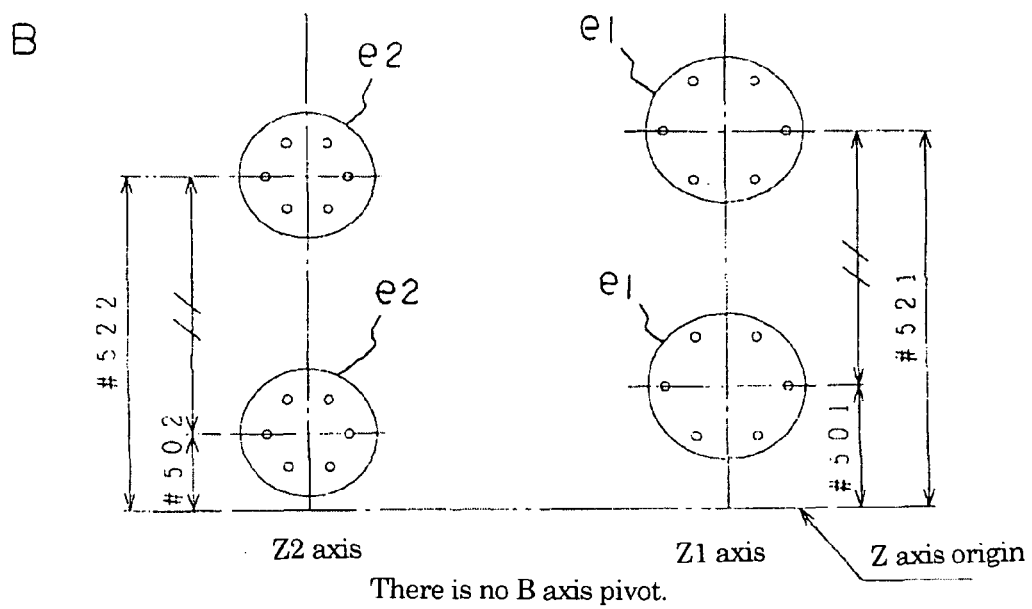

The positions in the Z axis direction and around the B axis of the work fixing table 25A are controlled by the computer numerical control device so that the appropriate action can be obtained in accordance with practical machining. For example, the control is carried out as shown in FIGS. 13, 14. In FIG. 13, a Z1 axis corresponds to the ball screw 32a, and a Z2 axis corresponds to the ball screw 32b. The numerical values like #511 and #521 are variables which coordinate points (positioning data) on positioning coordinates about the center of the shaft section e1 on the Z1 axis and the center of the shaft section e2 on the Z2 axis, and which are beforehand incorporated in the control program. The peculiar names (here, #511 and #521) are given to the coordinate points to memorize coordinate points for specifying the positions of the centers of the shaft sections e1, e2 at an optional time in a memory of the computer numerical control device for some time, read them from the memory at the time of need, and use them for information processing on the computer. θ represents a swiveling angle of the B axis, and L represents a distance between the Z1 axis and the Z2 axis. The term "Loose Table" means that the displacement regulating means 35 is in a non-regulation state, and the term "Tighten Table" means that the displacement regulating means 35 is in a regulation state.

Next, the principal construction of the above-mentioned example will be explained below.

The feed tables 30a, 30b are guided by a pair of guide tracks 28a, 28b in the Z axis direction to be movable independently. The guide tracks 28a, 28b respectively pass two positions separated in the X axis direction on the top surface of the bed 1, intersecting the X axis direction perpendicularly. The support/feed/turn output member 25 (work fixing table 25A) is arranged so as to bridge the feed tables 30a, 30b on the guide tracks 28a, 28b. One feed table 30a and the support/feed/turn output member 25 (the work fixing table 25A) are coupled to rotate relatively about a line in the Y axis direction which intersects perpendicularly both the X axis direction and the Z axis direction, and the other feed table 30b and the support/feed/turn output member 25 are coupled to rotate relatively about a line in the Y axis direction and to be relatively displaceable in a specific direction of a straight line connecting the centers of the shaft sections e1, e2 of the feed tables 30a, 30b. Accordingly, even without the conventional, comparatively large swiveling table protruding from the bed 1, the support/feed/turn output member 25 (work fixing table 25A) can be horizontally turned on the bed 1. Besides, the feed tables 30a, 30b can support two positions separated in the direction of the horizontal axis b1 on the bottom surface of the support/feed/turn output member 25 (work fixing table 25A), thereby lowering the amount of overhang from the support points and thereby diminishing the deflection by gravity of the support/feed/turn output member 25 (work fixing table 25A). Furthermore, the support/feed/turn output member 25 (work fixing table 25A) can be located relatively close to the top surface of the bed 1, thereby decreasing the displacement of the support/feed/turn output member 25 (work fixing table 25A) caused by the force of the tool 16a while machining the work. Moreover, the mass of members associated with the swiveling movement by which the support/feed/turn output member 25 (work fixing table 25A) is horizontally turned around an imaginary vertical axis can be reduced in comparison with the mass of the structure in which a conventional swiveling table is installed. Therefore, the moment of inertia caused by the horizontal swivel can be decreased, and horizontal swivelling can be carried out at high-speed. In addition, the non-cutting time of the tool 16a is shortened, thereby resulting in efficient machining. Furthermore, the energy necessary for horizontal swivelling can be reduced, thereby reducing the size and weight of the driving gears, such as the servomotors 33a, 33b.

Since the displacement regulating means 35 for regulating the relative displacement in the direction d1 is provided, the relative displacement between the feed table 30b and the support/feed/turn output member 25 (work fixing table 25A) can be controlled by the displacement regulating means 35 even if the feed tables 30b and the support/feed/turn output member 25 (work fixing table 25A) are guided in the specific direction d1 by the guide track 43 and the guided body 44. Here, the guide track 43 and the guided body 44 constitute a guiding means having comparatively small rigidity. Accordingly, the bond rigidity between the feed table 30b and the support/feed/turn output member 25 (work fixing table 25A) is made very large, thereby promoting the immobilization of the position of support/feed/turn output member 25 (work fixing table 25A) on the bed 1 and thereby improving the machining accuracy of the work w supported by the support/feed/turn output member 25 (work fixing table 25A).

Since the rotary spindle 17 movable in the X axis direction and in the Y axis direction and rotated around the line of the Z axis direction is provided on the bed 1, and since the support/feed/turn output member 25 installed at a position facing the rotary spindle 17 in the Z axis direction is formed in the work fixing table 25A, it is unnecessary to move the rotary spindle 17 in the Z axis direction when machining the work w, such as the crankshaft, supported on the work fixing table 25A to be rotatable around the horizontal axis b1.

Besides, the work w can be displaceable in the Z axis direction by the driving means (servomotors 33a, 33b) that turn the work w around a line in the Y axis direction. Furthermore, the effects due to the above-mentioned construction to work the work fixing table 25A can be also obtained.

Since the space between the Z axial guide tracks 28a, 28b of the bed 1, a Y axial through hole a4, and a driving mechanism for moving the feed tables 30a, 30b due to the screw action is arranged in the through hole a4, the chips generated in machining are efficiently dropped below the bed 1. Here, the through hole a4 is used as a recess for the screw mechanism. Besides, it is possible to drop the chips accumulated on the work fixing table 25A in the through hole a4 when the work fixing table 25A is moved over the through hole a4, and therefore, it is easy to clean the chips.

Since the Y axial position of the surface of the work fixing side of the work fixing table 25A almost coincides with the Y axial position of the X axial guide track 8a of the rotary spindle 17, it is possible to bring the work fixing surface of the work fixing table 25A and the center of the rotary spindle 17 of the spindle device 13 close to the top surface of the bed 1. Thus, the construction of the present invention contributes towards increasing the support rigidity of the spindle device 13 and the work fixing table 25A on the bed 1.

Since the driving means for moving each of the feed tables 30a, 30b in the Z axis direction is arranged at a Z axial place having a fixed depth near the Y axis direction of the side away from the rotary spindle on the bed 1, it is possible to simply arrange machine assemblies on the bed 1 and to discharge and clean the chips easily. Besides, it is possible to decrease the heights from the top surfaces of the spindle device 13 and the work fixing table 25A.

Next, modifications of the above-mentioned example will be explained.

Figure 15:
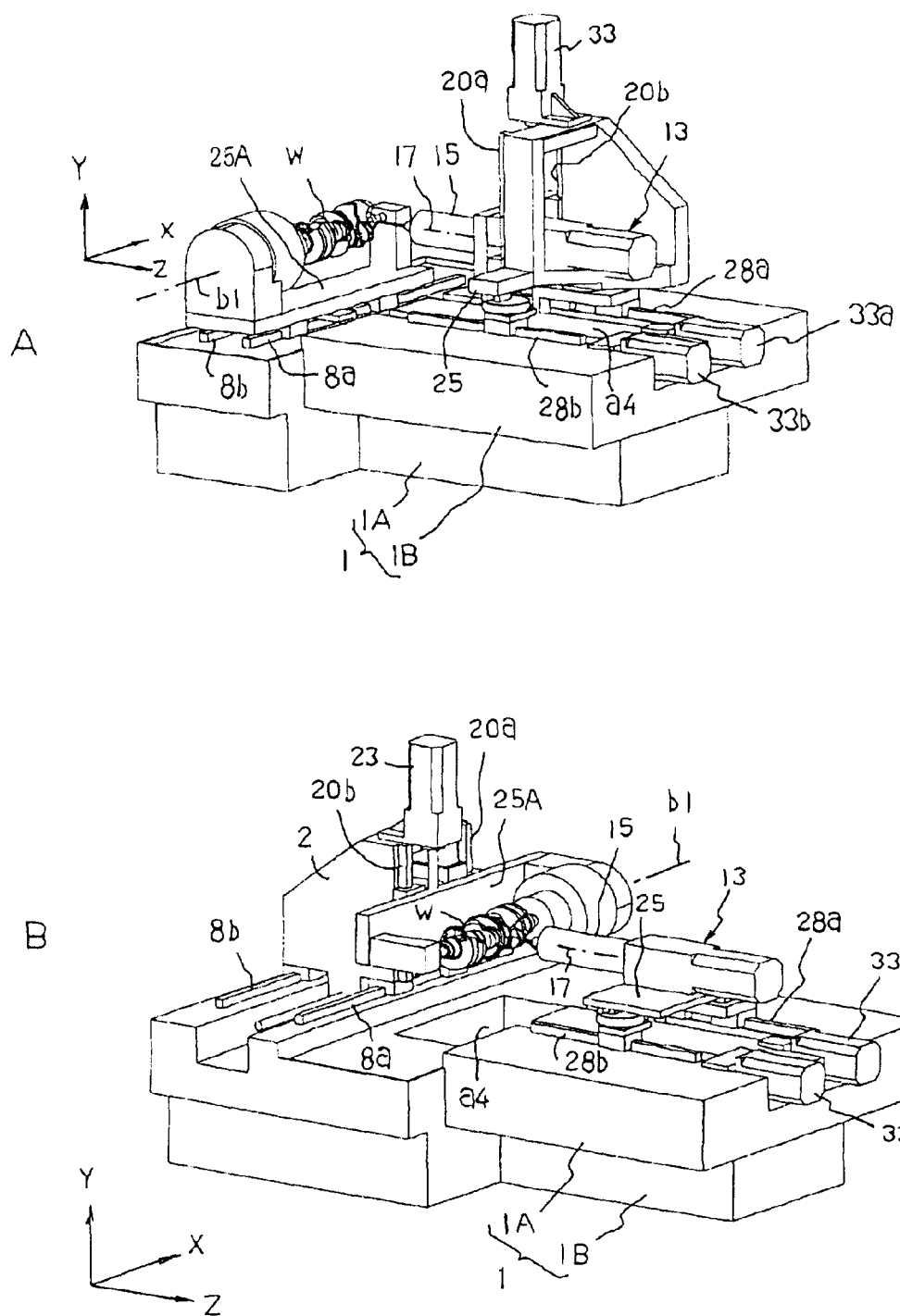
Figure 16:
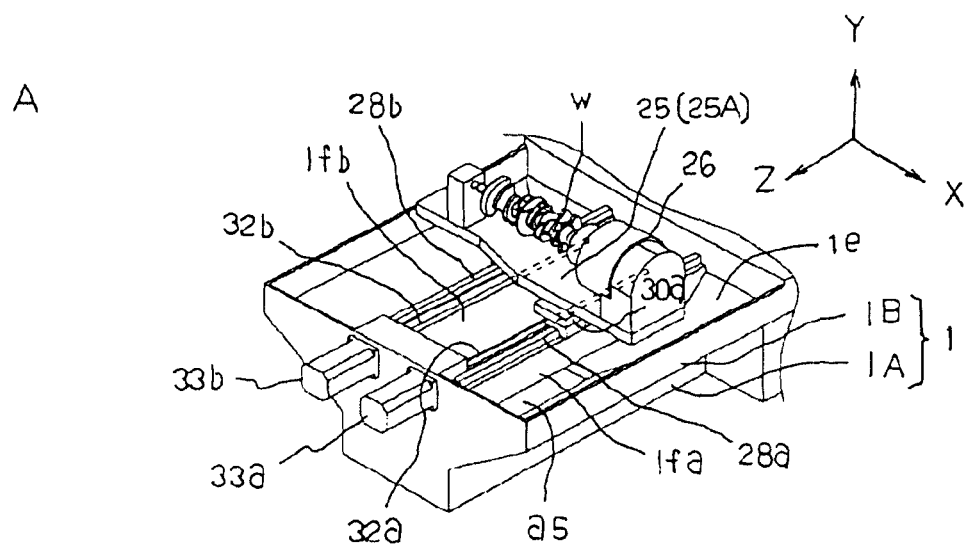
Figure 16:
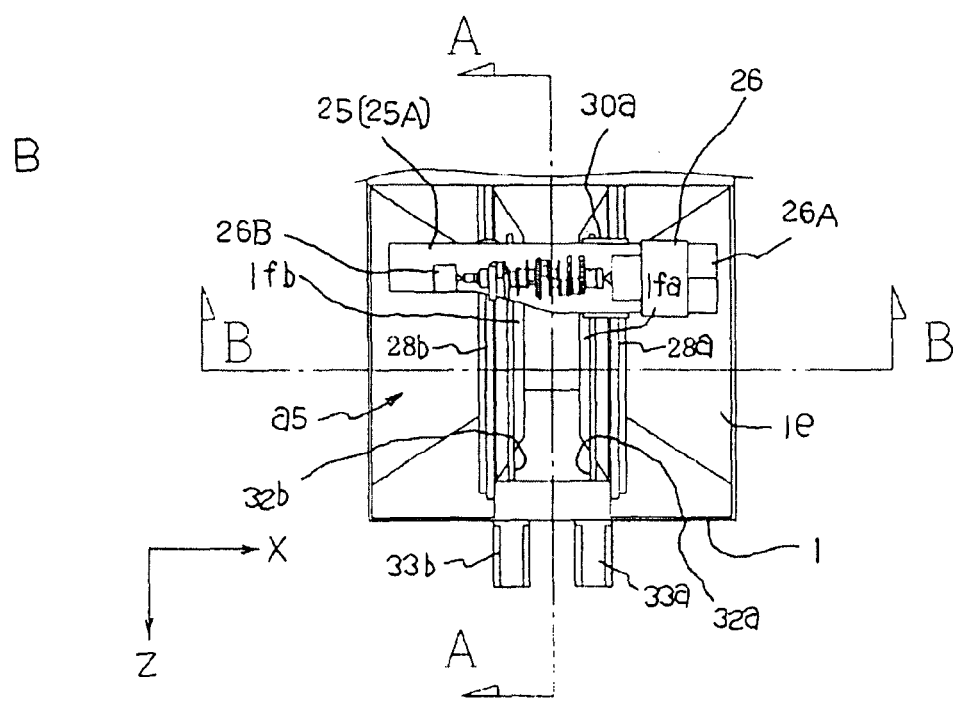
Figure 17:
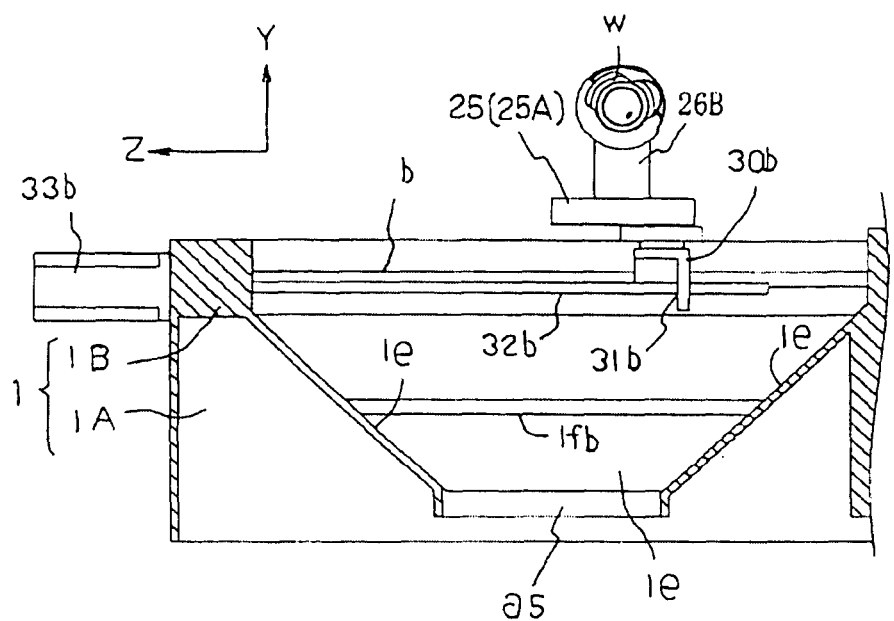
Figure 17:
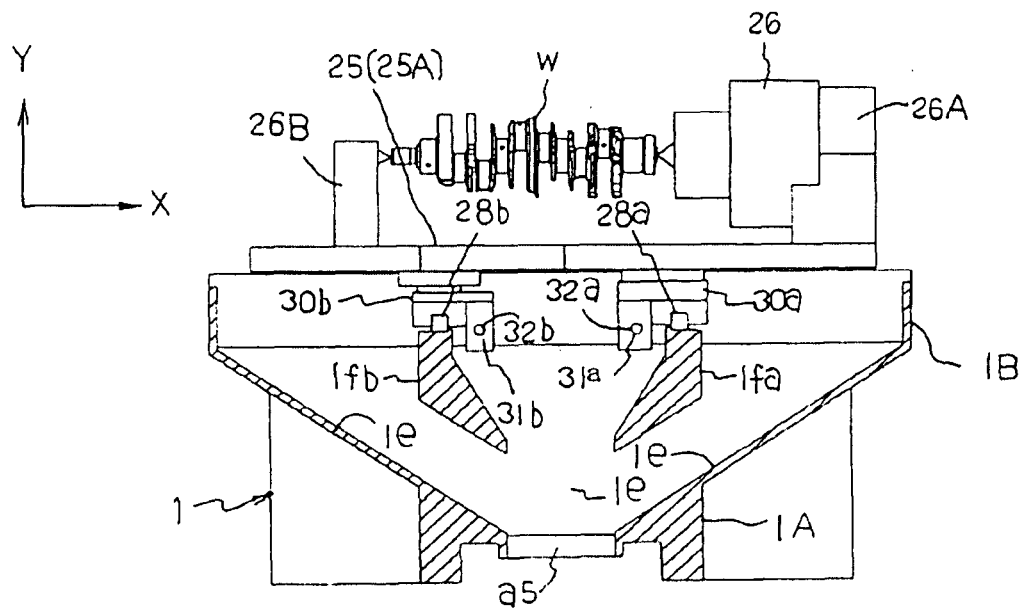
Figure 18:
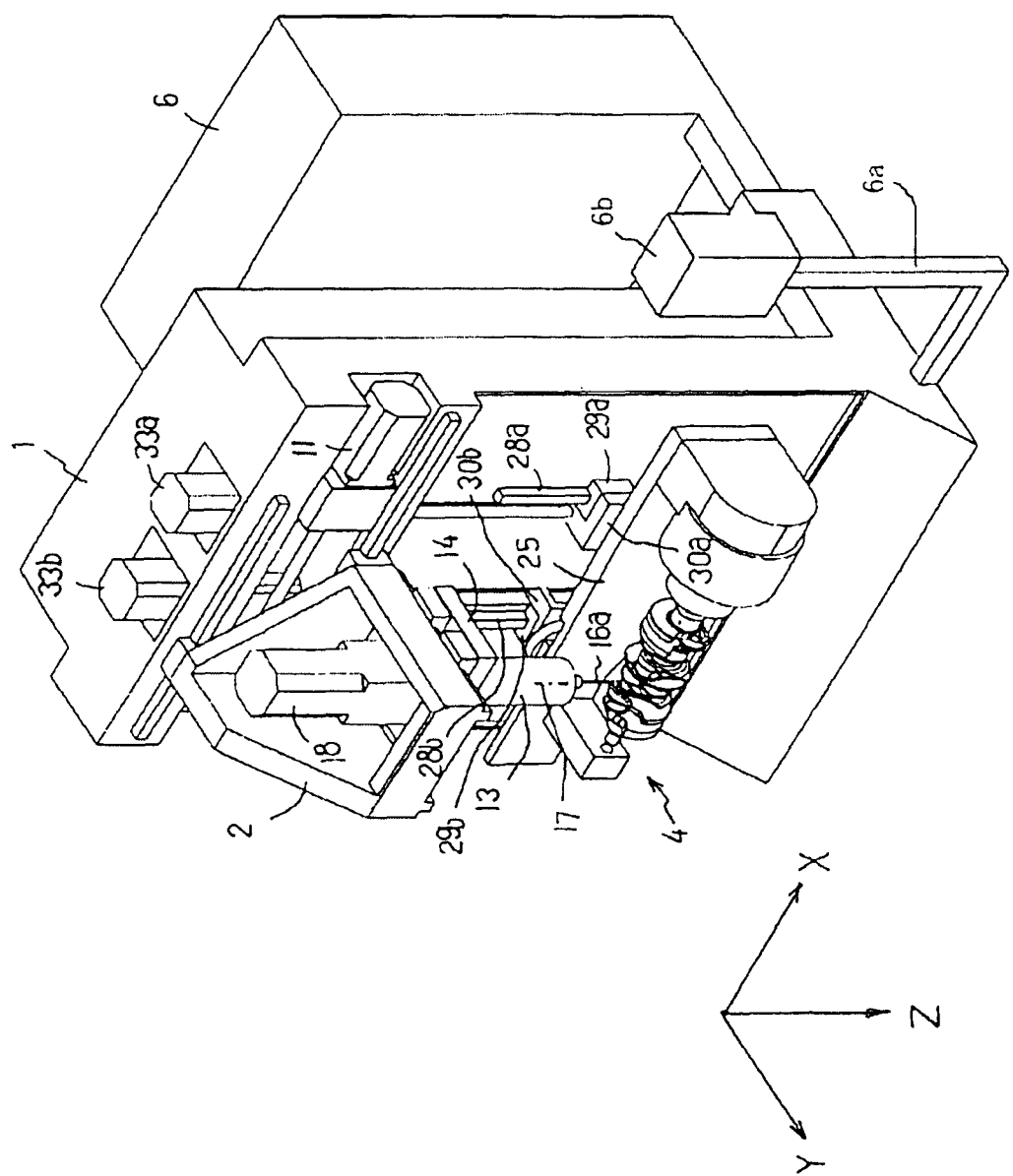
FIG. 18 is a perspective view of a fourth embodiment of the machining center.

FIG. 15 refers to one of the modifications. FIG. 15A is a plan view of the first modified embodiment, and FIG. 15B is a plan view of the second modified embodiment. FIG. 16 refers to the third modified embodiment. FIG. 16A is a perspective view and FIG. 16B is a plan view. FIG. 17 refers to the third modified embodiment. FIG. 17A is a sectional view taken on line A-A in FIG. 16 and FIG. 17B is a sectional view taken on line B-B in FIG. 16. FIG. 18 is a perspective view of the fourth modified embodiment. In these figures, the same reference numbers are used to refer to the portions that were used to refer to corresponding portions of the above-mentioned example.

For example, the following modifications can be carried out.

(1) Instead of the spindle device 13 of the above-mentioned example, as shown in FIG. 15A, a work fixing table 25A movable only in the X axis direction on the bed 1 is installed. In addition, the rotary spindle 17 movable in the Y axis direction and to be rotated around the line of the Z axis direction is installed on the support/feed/turn output member 25 located at the position facing the work fixing table 25A in the Z axis direction in the above-mentioned example.

That is, the machining center is so constructed that the work fixing table 25A is moved in only the X axis direction by the lateral guide tracks 8a, 8b and that the spindle device 13 with the rotary spindle 17 is moved in the Y axis direction by the vertical guide tracks 20a, 20b on the column 2 fixed to the support/feed/turn output member 25.

Accordingly, on the work fixing table 25A, in machining the work w, such as the crankshaft supported so as to be rotatable around the horizontal axis b1, it is unnecessary to move the work w in the Z axis direction and to turn it around the line of the Y axis direction. Besides, it is possible to move the spindle device 13 in the Z axis direction due to the driving means (servomotors 33a, 33b) turning the support/feed/turn output member 25 around the line of the Y axis direction. Furthermore, the effects due to the above-mentioned construction to work the support/feed/turn output member 25 can be also obtained.

(2) Instead of the spindle device 13 of the above-mentioned example, as shown in FIG. 15B, the work fixing table 25A movable in the X axis direction and the Y axis direction on the bed 1 is installed. In addition, the spindle device 13 with the rotary spindle 17 to be rotated around the line of the Z axis direction is installed on the support/feed/turn output member 25 located at the position facing the work fixing table 25A in the Z axis direction.

That is, in this machining center, the support/feed/turn output member 25 is not used the work fixing table 25A, but instead is used as a table for supporting the spindle device 13; and the support plate 14 is not used as a member for supporting the spindle device 13, but instead is used as the work fixing table 25A.

According to this, in machining the work w, such as the crankshaft, supported on the work fixing table 25A to be rotatable around the horizontal axis b1, it is unnecessary to move the rotary spindle 17 in the Y axis direction and besides to move the work w in the Z axis direction and to turn it around the line of the Y axis direction. Furthermore, it is possible to move the spindle device 13 in the Z axis direction due to the driving means (servomotors 33a, 33b) for turning the support/feed/turn output member 25 around the line of the Y axis direction. Furthermore, the effects due to the above-mentioned construction to work the support/feed/turn output member 25 can be obtained.

(3) The feed tables 30a, 30b are not formed in the screw mechanism or a mechanism for moving with the servomotors 33a, 33b, but are formed in a mechanism for moving with a linear motor. According to this, in driving the feed tables 30a, 30b, the friction between the members is decreased, thereby reducing electric power.

(4) A linear motor can be utilized as an alternate of any of the other servomotors.

(5) The guide tracks 28a, 28b and the guided bodies 29a, 29b of the feed tables 30a, 30b are formed in a linear bearing structure in which they are formed in rolling bearings doing linear motion, or formed in a square slide mechanism in which the guide tracks 28a, 28b are formed in a square stick shape having a plurality of guide surfaces and in which the guided bodies 29a, 29b are fitted to the guide surfaces closely and slidably. Accordingly, the feed tables 30a, 30b can be fed in a state with little friction and small gaps.

(6) A coupling relation between the shaft sections e1, e2 and the feed tables 30a, 30b is formed in a structure in which they are fixed by a hydraulic clamp mechanism etc., so as not to be relatively displaced at the time of use. According to this, the positional stability of the support/feed/turn output member 25 on the bed 1 increases, thereby improving the machining accuracy.

(7) Instead of horizontally turning the work fixing table 25A by moving the feed tables 30a, 30b in opposite directions in the Z axis by the same distance synchronously, the work fixing table 25A can be horizontally oscillated by moving only one of the feed tables 30a, 30b in the Z axis direction, or may be horizontally turned by moving the feed tables 30a, 30b by different distances asynchronously.

(8) As shown in FIGS. 16 and 17, a Y axial through hole a5 having a shape different from the through hole a4 is formed in the bed 1. The through hole a5 is provided with a funnel-like inside peripheral guideway section 1e in which the cross section of the pathway is gradually downwardly reduced. Near the upper end of the through hole a5, a pair of track supporting sections 1fa, 1fb is provided as a part of the stationary body section 1 to provide a bridge in the Z axis direction. Each of the track supporting sections 1fa, 1fb supports a respective one of the guide tracks 28a, 28b in the longitudinal direction. In addition, the support feeding mechanism 27 (the feed tables 30a, 30b, the nuts 31a, 31b and the ball screws 32a, 32b) for moving the feed tables 30a, 30b in the Z axis direction is arranged in the through hole a5. In this case, the track supporting sections 1fa, 1fb are shaped in a stick-form whose cross sections are the same at optional points in the Z axis direction. Furthermore, the ends in the Z axis direction of the track supporting sections 1fa, 1fb are coupled to the longitudinal portions of the leg 1A each having a comparative thickness.

According to this, when the work supported on the work fixing table 25A is machined, all of chips dropping from the circumference of the work fixing table 25A smoothly drop downward through a through hole portion between the track supporting sections 1fa, 1fb and through hole portions laterally outward of the track supporting sections 1fa, 1fb. Therefore, few chips remain on the stationary body section, thereby improving the machining accuracy and reducing the trouble of cleaning the chips. Furthermore, the periphery of the track supporting sections 1fa, 1fb becomes empty, thereby reducing the weight of materials of the stationary body section and contributing to keeping the track supporting sections 1fa, 1fb rigid.

In addition, the reason why the structure of the stationary body section 1 shown in FIGS. 16, 17 is enabled is that the conventional B-axial table disappears. That is, it is possible to set the work fixing table 25A on the stationary body section 1, close to the stationary body section 1, and it is not necessary to deeply go the feed mechanism for the work fixing table 25A into the stationary body section 1. As the result, it is possible to bridge the track supporting sections 1fa, 1fb on the top surface of the stationary body section 1, and it is possible to make the periphery of the stationary body section 1 room.

(9) As shown in FIG. 18, in this embodiment, the X axis direction of the machining center is the lateral direction, the Y axis direction is the longitudinal direction, and the Z axis direction is the vertical direction. In this case, the bed 1 has no through holes a4. The constructed machining center is efficient in carrying out machining due to the need for only a very small quantity of coolant supply, such as an oil mist supply. That is, although it is impossible to employ the very small quantity of coolant so as to wash out the chips accumulated on each part of the machine during the machining, the chips do not accumulate on the bed 1, but easily drop on the outside of the bed 1. In addition, because the rotary spindle 17 extends directly below from the supporting plate 14, and is not overhung laterally, it is possible to obtain various advantages in connection with the spindle device 13 turning right below. That is, there is little influence on the machining accuracy due to the modification and the displacement of the rotary spindle 17, even if the distance from the supporting plate 14 to the tip of the tool 16a is comparatively long, and it is possible to carry out high precision machining.

The embodiments of the machine tool of the present invention, in which the above-mentioned modification is included, are as follows.

(1) A machine tool having a work moving in a Z axis direction on a stationary body, for machining with a rotary spindle, comprises a pair of guide tracks extending in the Z axis direction away from an X axis direction intersecting the Z axis direction on the stationary body section, a pair of feed tables guided by said guide tracks to be movable independently, a support/feed/turn output member for supporting the work, and a control box controlling the rotary spindle machining. In this case, the support/feed/turn output member is arranged between the feed tables so as to define a bridge thereon, coupled with one feed table to be relatively rotatable around a line in a Y axis direction which intersects both the X axis direction and the Z axis direction perpendicularly, and coupled with the other feed table to be relatively rotatable around the line in the Y axis direction and to be relatively movable in a specific direction related to the positions of both feed tables. The control box changes a facing angle of the work relative to the rotary spindle by feeding the feed tables on the guide tracks so as to let the relative positions of the feed tables be different, thereafter feeding the feed tables thereon in the Z axis direction in a state in which the different relative positions relations are maintained.

(2) On the assumption of the construction of the above-mentioned (1), the rotary spindle is so constructed to be movable in the X axis direction and the Y axis direction on the stationary body section.

(3) On the assumption of the construction of the above-mentioned (1), the support/feed/turn output member is provided with a displacement regulating means for regulating relative displacement in a specific direction, and the control box regulates the relative displacement in the specific direction with the displacement regulating means after changing the facing angle of the work to the rotary spindle.

(4) A machine tool according to the present invention having a rotary spindle moving in the Z axis direction on a stationary body comprises a pair of guide tracks being extending in the Z axis direction away from the X axis direction intersecting the Z axis direction on the stationary body section, a pair of feed tables guided by said guide tracks to be movable independently, a support/feed/turn output member for supporting the rotary spindle, and a control box controlling the rotary spindle machining. In this case, the support/feed/turn output member is arranged between the feed tables so as to define a bridge thereon, with one feed table relatively rotatable around a line in the Y axis direction which intersects both the X axis direction and the Z axis direction perpendicularly, and with the other feed table relatively rotatable around the line in the Y axis direction and relatively movable in a specific direction relative to the positions of both feed tables. The control box changes a facing angle of the rotary spindle relative to the work by feeding the feed tables on the guide tracks so as to make the relative positions of the feed tables different, thereafter feeding the feed tables on the guide tracks in the Z axis direction in a state that the different relative positions are maintained.

(5) On the assumption of the construction of the above-mentioned (1), the X axis direction, the Y axis direction and the Z axis direction correspond to the lateral direction, the vertical direction and the longitudinal direction, respectively, or the X axis direction, the Y axis direction and the Z axis direction correspond to the lateral direction, the longitudinal direction and the vertical direction, respectively.

(6) On the assumption of the constructions of the above-mentioned (1), (2), (4), the X axis direction, the Y axis direction and the Z axis direction correspond to the lateral direction, the vertical direction and the longitudinal direction, respectively, and the stationary body section is provided with the Y axial through hole between the guide tracks.

(7) On the assumption of the construction of the above-mentioned (1), the X axis direction, the Y axis direction and the Z axis direction correspond to the lateral direction, the vertical direction and the longitudinal direction, respectively, and the stationary body section comprises the Y axial through hole having an inside peripheral guideway whose cross section is reduced gradually in a downward direction, and a pair of track supporting sections provided near an upper end of the through hole to bridge the through hole in the Z axis direction, wherein the guide tracks are supported by the track supporting sections.

In addition, in the present invention, the position in the Y axis direction of the work fixing surface of the work fixing table almost coincides with a position in the Y axis direction of the guide track for guiding the rotary spindle in the X axis direction. Furthermore, driving devices for moving the feed tables in the Z axis direction may be respectively arranged at the positions in the Z axis direction at a fixed depth in the Y axis direction of the stationary body section.

The effects by the above-mentioned devices are as follows.

In the case of (1), even if a conventional, comparatively large swiveling table protruding from the stationary body section is not provided, the support/feed/turn output member can move parallel to the Z axis direction and turn around a line in the Y axis direction on the stationary body section due to the displacement of the feed tables in the Z axis direction. In addition, because the two positions spaced on the stationary body section are supported by the two feed tables, even if the support/feed/turn output member is comparatively long, the overhang from each of the feed tables is reduced and the distortion of the support/feed/turn output member due to gravity is decreased. Furthermore, the support/feed/turn output member can be located near the stationary body section. Accordingly, in supporting the work or the rotary spindle on the support/feed/turn output member, it is possible to reduce the displacement of the support/feed/turn output member caused by a Z axial force from the tool, which is imposed during machining. In addition, since the mass of the members associated with the swiveling movement when the support/feed/turn output member turns around an imaginary pivot in the Y axis direction can be lowered as much as the mass of the swiveling table in comparison with the conventional case when a swiveling table is installed, it is possible to decrease the moment of inertia involved in turning. Therefore, turning movements can be carried out with high speed. Accordingly, by supporting the work or the rotary spindle on the support/feed/turn output member, the non-cutting time of the tool while carrying out a machining program for one work is shortened, and the machining can be efficiently carried out. In addition, it is possible to reduce the energy necessary for the turning movement, so that the driving system for moving the feed tables can be reduced in size and weight.

In the case of (2), in addition to the same effect as (1), the following effect can be obtained. That is, because the support/feed/turn output member serves as the work fixing table, the two positions separated in the longitudinal direction on the work fixing table are supported by the two feed tables, and the work fixing table overhanging from each of the feed tables is reduced, even if the work fixing table supports a long shaft-like work, such as a crankshaft. As a result, it is possible to decrease the distortion due to gravity acting on the work fixing table, and therefore, it is possible to improve the machining accuracy of the work. In addition, by supporting the work on the work fixing table through a positioning mechanism around a specific line parallel to both the X axis direction and the Z axis direction, a straight hole in an optional direction formed on a radial surface including a rotating central axis of the work can be machined efficiently and highly accurately. In this case, because the work fixing table is moved parallel to the Z axis direction as needed, the rotary spindle does not need to be moved in the Z axis direction.

In the case of (3), in addition to the same effect as (1), because the means for regulating relative displacement in the specific direction is provided, even if the feed tables and the support/feed/turn output member are guided in the specific direction by a guiding means having a comparatively small rigidity, the relative displacement between the feed tables and the support/feed/turn output member can be regulated by the means for regulating relative displacement. According to this, the coupling rigidity between the feed tables and the support/feed/turn output member is drastically increased, and the fixing of the position of the support/feed/turn output member on the stationary body section is enhanced. In supporting the work or the rotary spindle on the support/feed/turn output member, it is possible to enhance the machining accuracy of the work.

In the case of (4), in addition to the same effect as (1), because the rotary spindle is mounted on the support/feed/turn output member, the rotary spindle can be turned around an imaginary pivot in the Y axis direction. In addition, because the rotary spindle is turned in a specific direction parallel to both of the X axis direction and the Z axis direction against the work fixing table, and because the work is supported on the work fixing table by the position-dividing device around a specific line (preferably a line in the X axis direction) parallel to both of the X axis direction and the Z axis direction, it is possible to machine a straight hole in an optional direction formed in a radial surface including the rotating central axis of the work efficiently and highly accurately. In this case, as needed, the work fixing table is moved parallel to the Z axis direction together with the support/feed/turn output member and turned around an imaginary pivot in the Y axis direction, and therefore, it is not necessary to move the work parallel to the Z axis direction and to turn it around the imaginary pivot in the Y axis direction.

In the case of (5), in addition to the same effect as (1), in making the X axis direction, the Y axis direction and the Z axis direction correspond to the lateral direction, the longitudinal direction and the vertical direction, respectively, a setting space in the longitudinal direction can be reduced, even if the feed table moves extendedly in the Z axis direction. Since the rotary spindle is arranged above the support/feed/turn output member (the work fixing table), chips generated when the rotary spindle machines the work fixed on the work fixing table do not directly drop on the stationary body section. Besides, the chips are conveniently discharged, thereby effectively preventing adverse effects from the heat of the chips. Particularly, where infinitesimal coolant (oil mist) is supplied while machining the work, the contribution of the discharging of the chips is high because the coolant can not wash down the chips. Moreover, on the assumption of the second embodiment of the invention, since the rotary spindle is turned to the vertical direction, even if the rotary spindle protrudes from the supported position, the rotary spindle is controlled from displacing in a direction intersecting perpendicularly a line of the rotating center. Therefore, the machining can be carried out with high accuracy.

In the case of (6), in addition to the same effects as (1), (2), (4), the through hole enables the chips generated during the machining to fall below the stationary body section without help and serves as a hollow place for receiving a feeding device that moves the feed table in the Z axis direction. In the case of the second embodiment of the invention, it is possible for the chips accumulated on the work fixing table to fall into the through hole as the work fixing table moves over the through hole. Therefore, the chips are cleaned easily.

In the case of (7), it is possible to drop even chips dropped at the center of the opposite side of the guide tracks into the through hole, thereby further enhancing the effect of (6). Besides, even the chips generated in cutting due to the mist coolant supply hardly remain behind on the stationary body section, and therefore, the machining can be carried out with high accuracy. Furthermore, since the rigidity necessary for the stationary body section can be secured by the track supporting sections, it is possible to make the stationary body section lightweight without decreasing the rigidity excessively.

Further, according to the invention, since the X axial guide tracks of the rotary spindle approach the stationary body section like the work fixing table, the rotary spindle can approach the stationary body section like the work supported on the work fixing table. Accordingly, it is possible to increase the supporting rigidity of the work or the rotary spindle on the stationary body section.

Further, since the machine parts are simply arranged on the stationary body section, it is possible to easily discharge and clean the chips. Besides, it is possible to effectively decrease the distance from the supporting section of the stationary body section to the rotary spindle or the work fixing table.

The invention claimed is:

1. A machine tool having a work moving in a Z axis direction on a stationary body section and a rotary spindle for machining the work, comprising:
    a pair of guide tracks extending in the Z axis direction on the stationary body section, an X axis direction intersecting the Z axis direction;
    a pair of feed tables guided by said guide tracks and movable independently;
    a support/feed/turn output member for supporting the work, the support/feed/turn output member being arranged between said feed tables so as to bridge said feed tables, the support/feed/turn output member being coupled with one of said feed tables to be relatively rotatable around a line in a Y axis direction which intersects both the X axis direction and the Z axis direction perpendicularly, and the support/feed/turn output member being coupled with the other of said feed tables to be relatively rotatable around the line in the Y axis direction and to be movable in a specific direction related to the positions of the feed tables; and
    displacement regulating means for regulating relative displacement of the feed tables in the guide tracks in the specific direction, the displacement regulating means being provided on the support/feed/turn output member, wherein the displacement regulating means comprises a hole and a piston, the piston being pushed out of the hole for pressing against the support/feed/turn output member to restrict the relative displacement in the specific direction.

2. A machine tool as claimed in claim 1, wherein said rotary spindle is movable in both the X axis direction and the Y axis direction on the stationary body section.

3. A machine tool as claimed in clam 1, wherein said X axis direction, said Y axis direction and said Z axis direction correspond to a lateral direction, a vertical direction and a longitudinal direction, respectively, or said X axis direction, said Y axis direction and said Z axis direction correspond to a lateral direction, a longitudinal direction and a vertical direction, respectively.

4. A machine tool as claimed in claim 1, wherein the X axis direction, the Y axis direction and the Z axis direction correspond to a lateral direction, a vertical direction and a longitudinal direction, respectively, and said stationary body section is provided with a Y axial through hole between said guide tracks.

5. A machine tool as claimed in claim 1, wherein the X axis direction, the Y axis direction and the Z axis direction correspond to a lateral direction, a vertical direction and a longitudinal direction, respectively, and the stationary body section comprises a Y axial through hole whose cross section is reduced downward gradually, track supporting sections being provided near an upper end of the through hole to bridge the through hole in the Z axis direction, and the guide tracks being supported by the track supporting sections.

6. A machine tool as claimed in claim 1, further comprising a controller controlling the rotary spindle machining by changing a facing angle of the work relative to the rotary spindle by feeding the feed tables on the guide tracks so as to change the positions of the feed tables relative to one another, thereafter feeding the feed tables on the guide tracks in a line in the Z axis direction in a state in which the changed relative positions are maintained.

7. A machine tool having a rotary spindle moving in a Z axis direction on a stationary body section for machining a work, comprising:
    a pair of guide tracks extending in the Z axis direction on the stationary body section, an X axis direction intersecting the Z axis direction;
    a pair of feed tables guided by said guide tracks and movable independently;
    a support/feed/turn output member for supporting the rotary spindle, the support/feed/turn output member being arranged between said feed tables so as to bridge said feed tables, the support/feed/turn output member being coupled with one of said feed tables to be relatively rotatable around a line in a Y axis direction which intersects both the X axis direction and the Z axis direction perpendicularly, and the support/feed/turn output member being coupled with the other of said feed tables to be relatively rotatable around the line in the Y axis direction and to be movable in a specific direction related to the positions of the feed tables; and
    displacement regulating means for regulating relative displacement of the feed tables on the guide tracks in the specific direction, the displacement regulating means being provided on the ports/feed/turn output member,
    wherein the displacement regulating means comprises a hole and a piston, the piston being pushed out of the hole for pressing against the support/feed/turn output member to restrict the relative displacement in the specific direction.

8. A machine tool as claimed in claim 7, further comprising a controller controlling the rotary spindle machining by changing a facing angle of the work relative to the rotary spindle by feeding the feed tables on the guide tracks so as to change the positions of the feed tables relative to one another, thereafter feeding the feed tables on the guide tracks in a line in the Z axis direction in a state in which the changed relative positions are maintained.

* * * * *